(12) United States Patent
Nomura

(10) Patent No.: US 8,493,468 B2
(45) Date of Patent: Jul. 23, 2013

(54) IMAGING DEVICE AND IMAGING METHOD

(75) Inventor: Kenichiroh Nomura, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 303 days.

(21) Appl. No.: 12/874,519

(22) Filed: Sep. 2, 2010

(65) Prior Publication Data

US 2011/0050950 A1 Mar. 3, 2011

(30) Foreign Application Priority Data

Sep. 3, 2009 (JP) ................................ 2009-203450

(51) Int. Cl.
*H04N 9/73* (2006.01)
*H04N 9/68* (2006.01)
*H04N 5/238* (2006.01)
*G06K 9/00* (2006.01)
*G06K 9/40* (2006.01)

(52) U.S. Cl.
USPC ........ 348/223.1; 348/237; 348/366; 382/163; 382/274

(58) Field of Classification Search
USPC ............. 348/222.1, 223.1, 225.1, 229.1, 234, 348/235, 237, 335, 362–366; 382/162–166, 382/254, 274
See application file for complete search history.

(56) References Cited

U.S. PATENT DOCUMENTS

| | | | |
|---|---|---|---|
| 6,747,694 B1 * | 6/2004 | Nishikawa et al. | 348/229.1 |
| 2006/0262363 A1 * | 11/2006 | Henley | 358/516 |
| 2008/0266418 A1 * | 10/2008 | Imai et al. | 348/229.1 |
| 2010/0208099 A1 | 8/2010 | Nomura | |

FOREIGN PATENT DOCUMENTS

| | | |
|---|---|---|
| EP | 2 161 938 A2 | 3/2010 |
| JP | 2004-48563 | 2/2004 |
| JP | 2004-120229 | 4/2004 |
| JP | 2007-104408 | 4/2007 |
| JP | 2010-62802 | 3/2010 |

* cited by examiner

*Primary Examiner* — Sinh Tran
*Assistant Examiner* — Mark Monk
(74) *Attorney, Agent, or Firm* — Oblon, Spivak, McClelland, Maier & Neustadt, L.L.P.

(57) ABSTRACT

An imaging apparatus includes an image pickup element to acquire a short-exposure-image data and a long-exposure-image data; a white balance evaluation value acquiring device to acquire white balance evaluation value for each of short-exposure-image data and long-exposure-image data; a white extraction range setting device to set a white extraction range for each of short-exposure-image data and long-exposure-image data; a white extraction device to extract white extraction result on the basis of the white balance evaluation value and the white extraction range for each of short-exposure-image data and long-exposure-image data; a correction factor calculating device to calculate corrected white extraction results from the white extraction result on the basis of the white extraction range and calculate correction factor for each of short-exposure-image data and long-exposure-image data; a white balance correcting device to correct the short-exposure-image data and the long-exposure-image data to form white balance corrected short-exposure-image data and white balance corrected long-exposure-image data by using the correction factors; and a synthesizing device configured to synthesize the white balance corrected short-exposure-image data and the white balance corrected long-exposure-image data.

9 Claims, 20 Drawing Sheets

FIG. 5

| | CONTROL VALUE |
|---|---|
| Tv 1/125 | 0 |
| Tv 1/60 | 16 |
| Tv 1/30 | 32 |
| Tv 1/15 | 48 |
| Tv 1/8 | 64 |

| | CONTROL VALUE |
|---|---|
| Av F8.0 | 0 |
| Av F5.6 | 16 |
| Av F4.0 | 32 |
| Av F2.8 | 48 |
| Av F2.0 | 64 |

| | CONTROL VALUE |
|---|---|
| ISO100 | 0 |
| ISO200 | 16 |
| ISO400 | 32 |
| ISO800 | 48 |
| ISO1600 | 64 |

| TARGET BLOCK | RANGE OF INTEGRATED VALUE OF 6 BLOCKS OF DIFFERENT TYPES (WITHIN 5%) |
|---|---|
| R INTEGRATED VALUE: 128 | 121 ~ 135 |
| G INTEGRATED VALUE: 128 | 85 ~ 95 |
| B INTEGRATED VALUE: 128 | 57 ~ 63 |

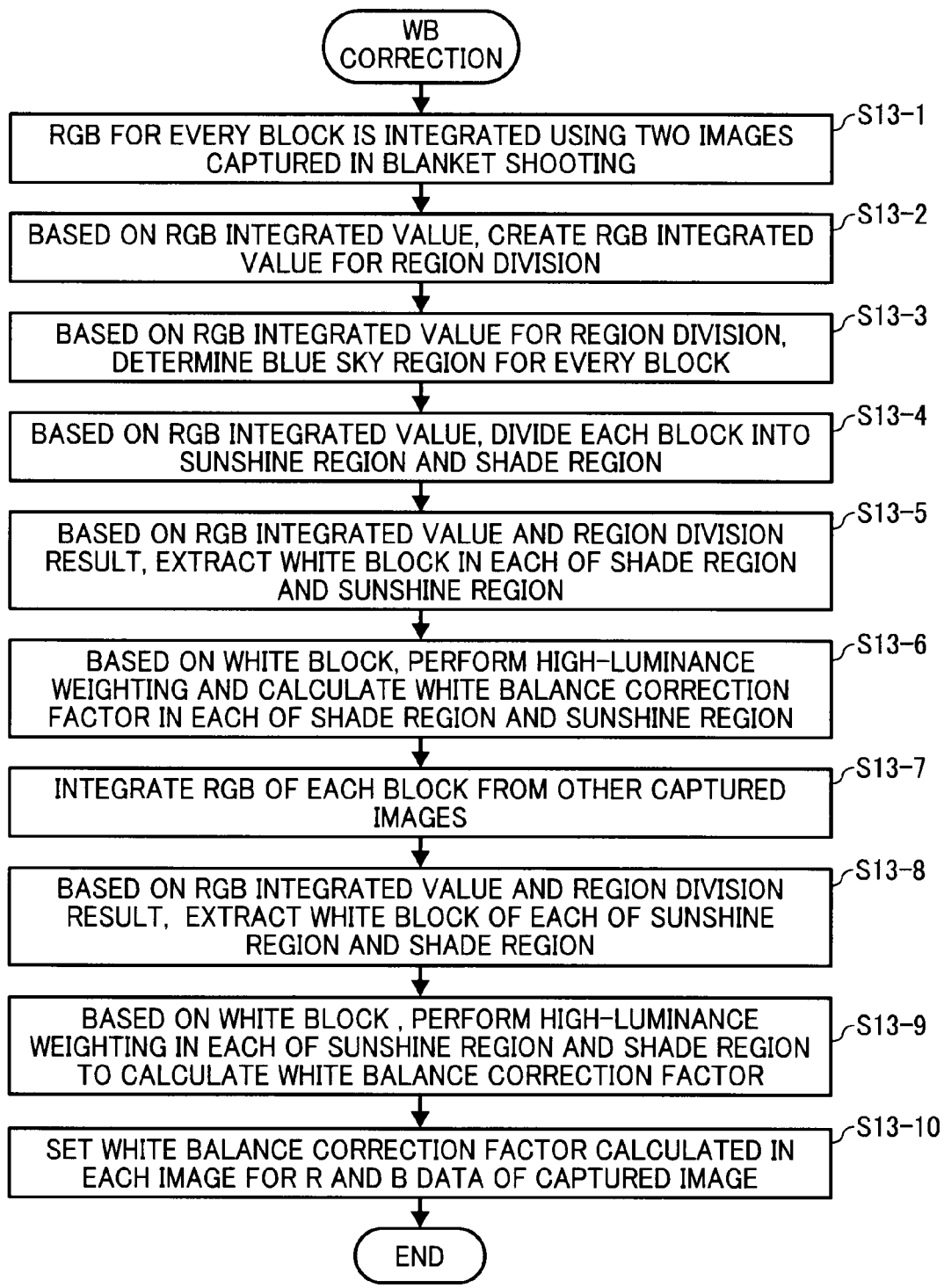

IMAGING DEVICE AND IMAGING METHOD

CROSS REFERENCE TO RELATED APPLICATIONS

The present application is based on and claims priority from Japanese Application Number 2009-203450, filed on Sep. 3, 2009, the disclosure of which is hereby incorporated by reference herein in its entirety.

BACKGROUND OF THE INVENTION

1. Field of the Invention

The present invention relates to an imaging apparatus and an imaging method which perform white balance control, and to a computer-readable recording medium in which a program for causing a computer to perform the imaging method is recorded.

2. Description of the Related Art

In the field of an imaging apparatus such as a digital steel camera or the like, white balance correction is performed to achieve constant color reproducibility even when color temperatures of a subject differ.

However, even with a technique related to this white balance correction, there is a problem that when an indoor scene is imaged, for example, an unnatural image as a whole is produced in which a blue sky seen from a window is white out although an image of a subject inside a room is good. This is because a dynamic range of the image is narrow.

Thus, in order to solve the problem, conventionally, the dynamic range of an image has been expanded by imaging and synthesizing two images. For example, a first short exposure image is captured by releasing the high-speed shutter, and, in succession, a second long exposure image is captured by releasing the low-speed shutter. Then, the two images are synthesized in such a manner that a scene outside the window which looks well in a low-sensitive image overlaps a high-sensitive image in which the scene in the room looks well.

Furthermore, Japanese Patent Application Publication No. 2004-48563 discloses a method using a white balance gain calculated from a high-power image as a white balance gain to be applied to both a high-power image and a low-power image before being synthesized, applied to a high-power image only, or applied to an image produced by synthesizing a high-power image and a low-power image, in an imaging apparatus which outputs an image of wide dynamic range by synthesizing a high-power image and a low-power image photographed by a solid-state imaging apparatus.

Still furthermore, Japanese Patent Application Publication No. 2004-120229 discloses a method applying a white balance gain calculated from a long exposure image for a white balance gain for an image in which a short exposure image and the long exposure image with their color balance adjusted are synthesized.

However, in the methods described above, a white balance gain set for a long exposure image is calculated only from a long exposure image. For this reason, white in a high-luminance part where a light source color is reflected better cannot be extracted from an image exposed for a time equal to or longer than an exposure time of an image captured by an imaging apparatus that does not use normal synthesis processing. Consequently, these methods have a problem that highly accurate white balance correction cannot be performed.

SUMMARY OF THE INVENTION

The present invention has been made in light of the aforementioned problems in the conventional art, and an object of the present invention is to provide an imaging apparatus and an imaging method which can perform good white balance correction which does not cause a color shift across the picture plane even in an image obtained by synthesizing long-exposure-image data and short-exposure-image data, and a computer-readable recording medium in which a program for causing a computer to perform the imaging method is recorded.

In order to solve the aforementioned problems, an imaging apparatus includes an image pickup element configured to convert light from an optical system for a short time into an electric signal to output a short-exposure-image data, and convert light from the optical system for a long time into an electric signal to output a long-exposure-image data; a white balance evaluation value acquiring device configured to acquire a white balance evaluation value for short-exposure-image data from the short-exposure-image data, and acquire a white balance evaluation value for long-exposure-image data from the long-exposure-image data; a white extraction range setting device configured to set a white extraction range for short-exposure-image data and a white extraction range for long-exposure-image data; a white extraction device configured to extract a short-exposure-image data white extraction result on the basis of the white balance evaluation value for short-exposure-image data and the white extraction range for short-exposure-image data, and extract a long-exposure-image data white extraction result on the basis of the white balance evaluation value for long-exposure-image data and the white extraction range for long-exposure-image data; a correction factor calculating device configured to calculate a short exposure image white balance correction factor by using the short-exposure-image data white extraction result, and calculate a long exposure image white balance correction factor by using the long-exposure-image data white extraction result; a white balance correcting device configured to correct the short-exposure-image data to form white balance corrected short-exposure-image data by using the short exposure image white balance correction factor, and correct the long-exposure-image data to form white balance corrected long-exposure-image data by using the long exposure image white balance correction factor; and a synthesizing device configured to synthesize the white balance corrected short-exposure-image data and the white balance corrected long-exposure-image data.

BRIEF DESCRIPTION OF THE DRAWINGS

FIG. 5 is a view showing one example of AE control values.

FIG. 22 is a flow diagram showing a flow of a series of WB correction processing in a thirteenth embodiment of the imaging apparatus according to the present invention.

DETAILED DESCRIPTION OF THE PREFERRED EMBODIMENTS

Figure 1:
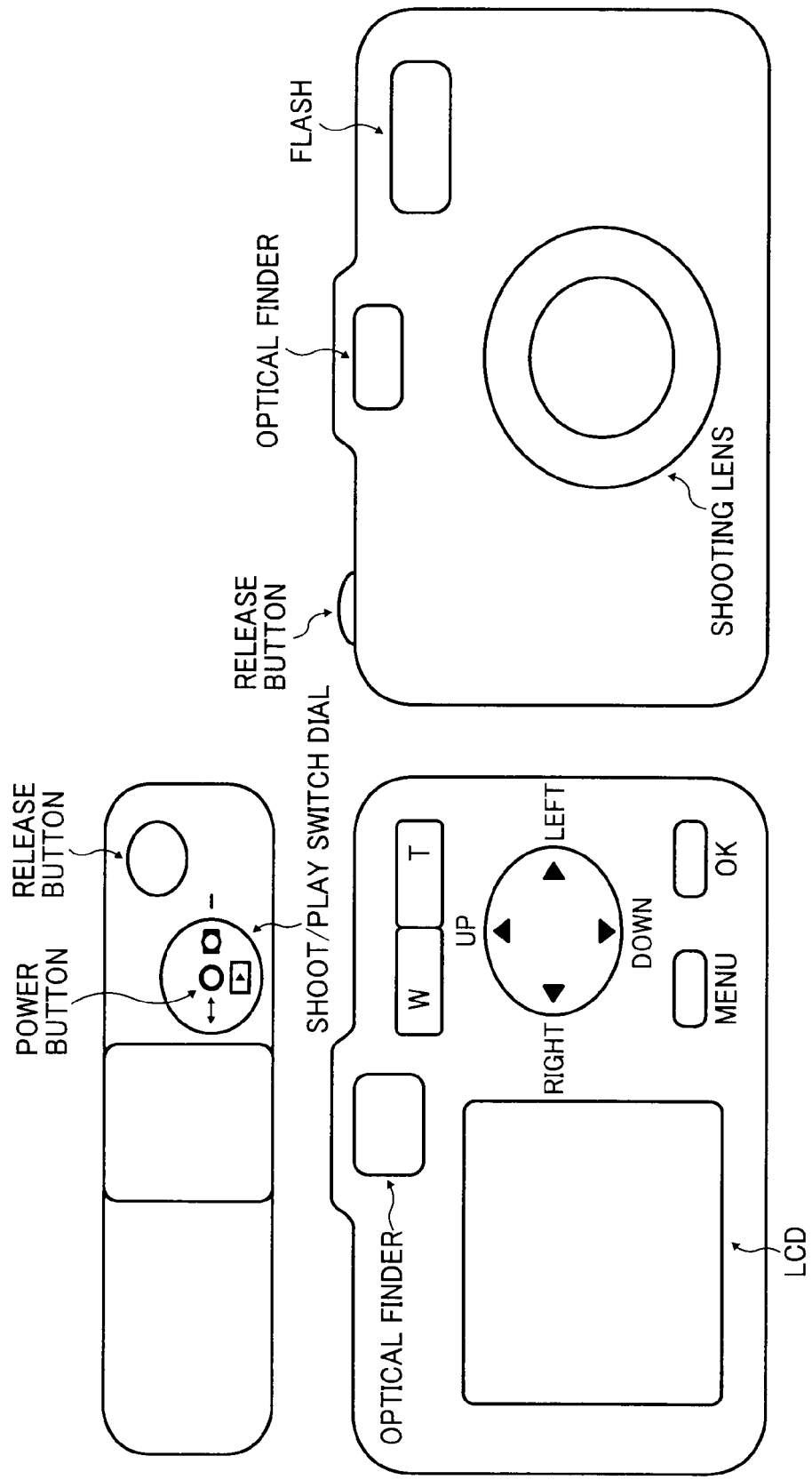
FIG. 1 is a schematic view showing an appearance of a digital camera which is one embodiment of an imaging apparatus according to the present invention.

An imaging apparatus according to an embodiment of the present invention includes: an image pickup element configured to convert light from an optical system for a short time into an electric signal to output a short-exposure-image data, and convert light from the optical system for a long time into an electric signal to output a long-exposure-image data; a white balance evaluation value acquiring device configured to acquire a white balance evaluation value for short-exposure-image data from the short-exposure-image data, and acquire a white balance evaluation value for long-exposure-image data from the long-exposure-image data; a white extraction range setting device configured to set a white extraction range for short-exposure-image data and a white extraction range for long-exposure-image data; a white extraction device configured to extract a short-exposure-image data white extraction result on the basis of the white balance evaluation value for short-exposure-image data and the white extraction range for short-exposure-image data, and extract a long-exposure-image data white extraction result on the basis of the white balance evaluation value for long-exposure-image data and the white extraction range for long-exposure-image data; a correction factor calculating device configured to calculate a short exposure image white balance correction factor by using the short-exposure-image data white extraction result, and calculate a long exposure-image white balance correction factor by using the long-exposure-image data white extraction result; a white balance correcting device configured to correct the short-exposure-image data to form white balance corrected short-exposure-image data by using the short exposure image white balance correction factor, and correct the long-exposure-image data to form white balance corrected long-exposure-image data by using the long exposure image white balance correction factor; and a synthesizing device configured to synthesize the white balance corrected short-exposure-image data and the white balance corrected long-exposure-image data.

In the imaging apparatus according an embodiment of the present invention, the correction factor calculating device may be configured to calculate a corrected long-exposure-image data white extraction result from the long-exposure-image data white extraction result on the basis of the white extraction range for short-exposure-image data and calculate the short exposure image white balance correction factor by using the corrected long-exposure-image data white extraction result and the short-exposure-image data white extraction result, and calculate a corrected short-exposure-image data white extraction result from the short-exposure-image data white extraction result on the basis of the white extraction range for long-exposure-image data and calculate the long exposure image white balance correction factor by using the corrected short-exposure-image data white extraction result and the long-exposure-image data white extraction result.

Additionally, there is another problem that white balance correction cannot be correctly performed in white extraction using a common white extraction range, due to a timing difference in sampling hold caused by the fact that a long exposure image and a short exposure image have a different drive frequency of an image pickup element (hereinafter also referred to as an imager) or due to a different voltage to be applied to an imager.

Therefore, in the imaging apparatus according to the present invention, it is preferable that the white extraction range setting device sets the white extraction range for short-exposure-image data and the white extraction range for long-exposure-image data, in accordance with a voltage to be applied to the image pickup element, and/or that the white extraction range setting device sets the white extraction range for short-exposure-image data and the white extraction range for long-exposure-image data, in accordance with a drive frequency of the image pickup element.

A basic configuration of the imaging apparatus according to an embodiment of the present invention will be described in detail hereinafter with reference to the drawings.

In addition, various technologically preferable limitations are imposed on embodiments to be described later as they are preferred embodiments of the present invention. However, the scope of the present invention should not be limited to these aspects unless it is otherwise stated in the following description that the present invention is limited by the limitations.

FIG. 1 is a schematic diagram showing appearance of a digital camera which is one embodiment of an imaging apparatus according to the present invention.

(Appearance Configuration of Digital Camera)

As shown in FIG. 1, a release button (shutter button), a power button, and a shoot/play switch dial are provided on the top surface side of the digital camera according to the embodiment, and a lens barrel unit having a shooting lens system, a strobe light-emitting unit (flash), and an optical finder are provided on the front side (front surface side) of the digital camera.

On the rear side of the digital camera, a liquid crystal monitor (LCD), an eyepiece section of the optical finder, a wide-angle side zoom (W) switch, a telephoto side zoom (T) switch, a menu (MENU) button, a confirm button (OK button), or the like are provided. In addition, inside a side of the digital camera, a memory card housing house a memory card for saving data of photographed images is provided.

(System Configuration of Digital Camera)

Figure 2:
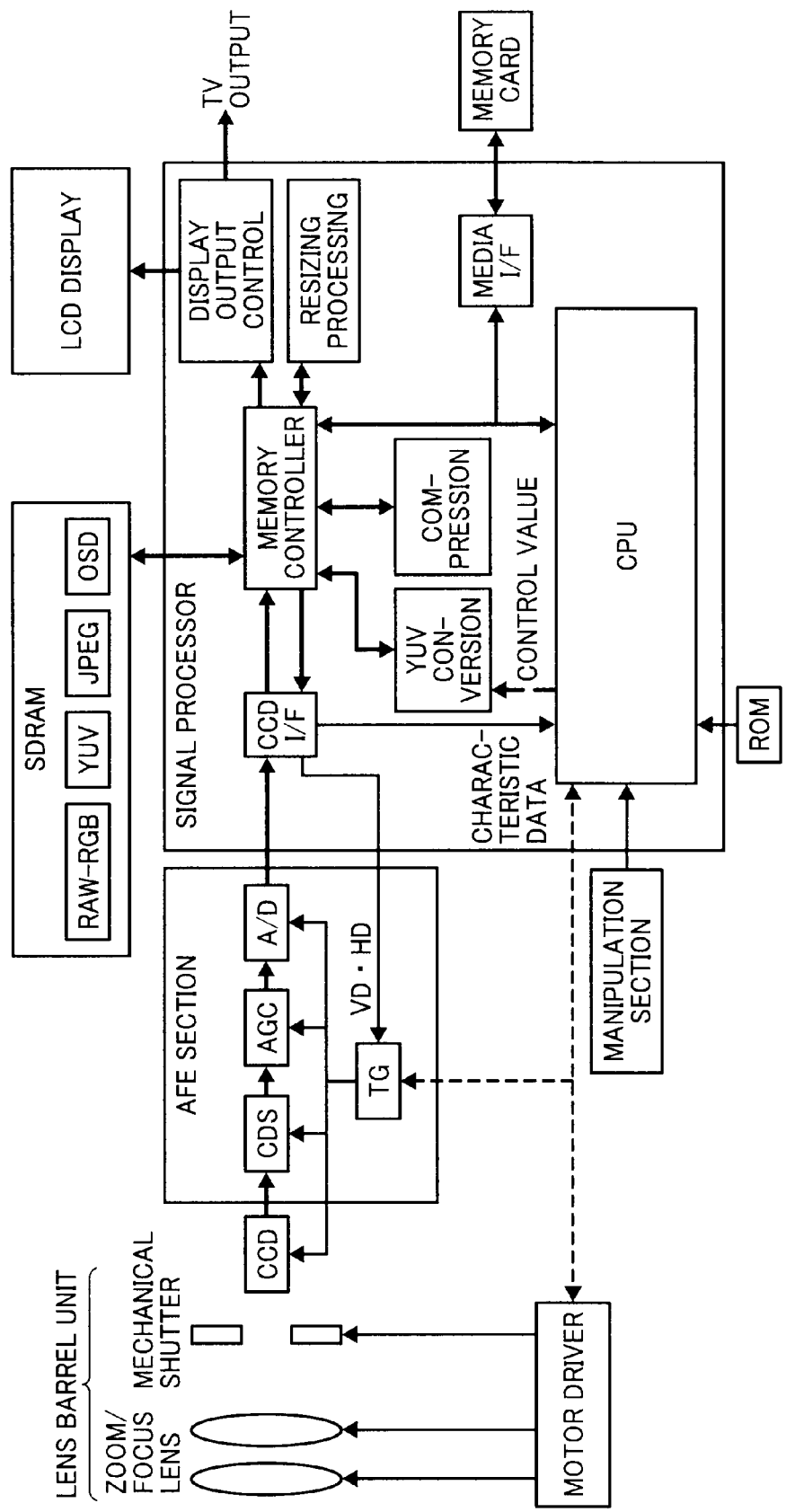
FIG. 2 is a block diagram showing a configuration of a digital camera which is a first embodiment of the imaging apparatus according to the present invention.

FIG. 2 is a block diagram showing a configuration of a digital camera which is a first embodiment of an imaging apparatus according to an embodiment of the present invention.

As shown in FIG. 2, in this digital camera provided are a CCD as a solid-state image pickup element (imager) which forms a subject image, entering through a shooting lens system (optical system) installed on the lens barrel unit, on a light receiving surface, an analog front end section (AFE section) which processes an electric signal (analog RGB image signal) to be outputted from the CCD into a digital signal, a signal processor which processes a digital signal to be outputted from the AFE section, an SDRAN which temporarily stores data, a ROM in which a control program or the like is stored, a motor driver, or the like.

The lens barrel unit includes a shooting lens system having a zoom lens or a focus lens or the like, an aperture unit, and a mechanical shutter unit. Each drive unit (not shown) of the shooting lens system, the aperture unit (not shown), and the mechanical shutter unit is driven by a motor driver. The motor driver is drive-controlled by a drive signal from a controller (CPU) of the signal processor.

The CCD has an RGB primary color filter as a color separation filter arranged on multiple pixels constituting the CCD, and outputs electric signals (analog RGB image signal) corresponding to three RGB primary colors.

The AFE section includes a TG (timing signal generator) which drives the CCD, a CDS (correlation double sampler) which samples electric signals (analog RGB image signals) to be outputted from the CCD, an AGC (analog gain controller) which controls a gain of an image signal sampled at the CDS, and an A/D which converts the image signal which is gain adjusted by the AGC into a digital signal (RAW-RGB data).

The signal processor includes: a CCD interface (CCDI/F) which outputs a picture plane horizontal synchronization signal (HD) and a picture plane vertical synchronization signal (VD) to the TG of the AFE section and captures RAW-RGB data to be outputted from the A/D of the AFE section, in accordance with these synchronization signals; a memory controller which controls the SDRAM; a YUV converter which converts the captured RAW-RGB data into image data of a YUV format that can be displayed or recorded; a resizing processor which changes an image size according to the size of image data to be displayed or recorded; a display output controller which controls display output of image data; a data compressor which records image data in JPEG format or the like; a media interface (media I/F) which writes image data into the memory card or reads image data written in the memory card; and a controller (CPU) which performs system control or the like of the entire digital camera on the basis of manipulation input information from a manipulation section according to a control program stored in a ROM.

The manipulation section includes the release button, the power button, the shoot/play switch dial, the wide-angle side zoom switch, the telephoto side zoom switch, the menu button, the confirm button or the like provided on the appearance surface of the digital camera (see FIG. 1). A predetermined action instruction signal is inputted into the controller by manipulation of a photographer.

In the SDRAM, not only RAW-RGB data captured into the CCDI/F and YUV data (image data in YUV format) which has been converted by the YUV converter are saved, but also image data for JPEG formation or the like which is compressed and processed by the data compressor is saved. In addition, An OSD (on-screen display) is data which is displayed on an LCD display and on which configuration information of a manipulation system is superimposed on YUV data or a JPEG image.

Additionally, YUV of the YUV data is a format which displays a color by luminance data (Y), and information on a color difference (a difference (U) between the luminance data and blue (B) component data and a difference (V) between the luminance data and red (R) component data).

(Monitoring Operation and Still Image Shooting Operation of Digital Camera)

A monitoring operation and a still image shooting operation of a digital camera will be described below. The digital camera performs a still image shooting operation while performing a monitoring operation, to be described later, in a still image shoot mode.

First, when a photographer turns on the power button and sets the shoot/play switch dial to a shoot mode (still image shoot mode), the digital camera starts in a record mode. When the controller detects that the power button is turned en and the shoot/play switch dial is set to the shoot mode, the controller outputs a control signal to the motor driver to move the lens barrel unit to a position where shooting is possible. The controller also starts the CCD, the AFE section, the signal processor, the SDRAM, the ROM, the liquid crystal monitor, or the like Then, when the shooting lens system of the lens barrel unit is directed to a subject, a subject image which enters through the shooting lens system is formed on a light receiving side of each pixel of the CCD. Then, an electric signal (analog RGB image signal) corresponding to a subject image to be outputted from the CCD is inputted in the A/D by way of the CDS and the AGC, and converted into RAW-RGB data of 12 bits by the A/D.

This RAW-RGB data is captured in the CCDI/F of the signal processor, and saved in the SDRAM by way of the memory controller. After that, the RAW-RGB data read from the SDRAM is inputted into the YUV converter, converted into YUV data (YUV signal) being a format that can be displayed, and then saved in the SDRAM by way of the memory controller.

Then, the YIN data read from the SDRAM by way of the memory controller is sent to the liquid crystal monitor (LCD display) by way of the display output controller, and shot images (moving images) are displayed. At the time of monitoring when shot images are displayed on the aforementioned liquid crystal monitor (LCD display), one frame is read out in 1/30 seconds by decimating the pixel count by the CCDI/F.

In addition, the monitoring operation is a situation in which shot images (moving images) are only displayed on the liquid crystal monitor (LCD display) which serves as an electronic finder, and in which the release button has not yet been pressed (including pressing the button halfway).

By displaying the shot images on the liquid crystal monitor (LCD display), checking a composition for shooting a still image or the like can be made. In addition, the shot images (moving images) can be displayed on an external TV (television) set by outputting them as a TV video signal from the display output controller through a video cable.

Then, the CCDI/F of the signal processor calculates an AF (automatic focus) evaluation value, an AE (automatic exposure) evaluation value, and an AWB (automatic white balance) evaluation value from the captured RAW-RGB data. Note that, in this embodiment, a white balance evaluation value is an AWB evaluation value, and a white balance evaluation value acquiring device is a part of the CCDI/F of the signal processor.

An AF evaluation value is calculated by an output integral value of a high frequency component extraction filter or an integral value of a luminance difference of adjacent pixels, for example. Since an edge part of a subject is clear in a focused state, high frequency components have the highest value. Utilizing this, an AF evaluation value at each focus lens position in the shooting lens system is acquired in AF operation (in focusing detecting operation), and the AF operation is performed with a point where the AF evaluation value becomes maximum being a focusing detected position.

An AE evaluation value and an AWB evaluation value are calculated from each integral value of an RGB value in the RAW-RGB data. For example, after a picture plane corresponding to light receiving surfaces of all pixels in the CCD is equally divided into 256 areas (blocks) (horizontally divided into 16 blocks, vertically divided into 16 blocks), an RGB integrated value of each area (block) is calculated by the CCDI/F.

In addition, in the present invention, the number of blocks shall not be limited to 16×16=256 (however, in the case of n blocks, n≧4 should be satisfied). In addition, although the present invention does not necessarily require the picture plane to be divided equally, it is preferable that all blocks are formed in a way that they have the same area and the same shape.

Now, an RGB integrated value will be described in detail.

The calculation of an RGB integrated value shall be performed for each of the abovementioned blocks. Since a block in the embodiment is the shot image equally divided into 256 blocks as described above, each block has approximately 39,000 pixels if the shot image has approximately 10 million pixels. Here, each of the pixels that each of the blocks has constitutes information on R, G, or B component of a corresponding subject part, and each component is recorded and used as 8 bit information (0 to 256) in the embodiment. That is to say, in each of 256 blocks, there is information on the 8-bit R, G, or B component for the number of pixels each block has (approx. 10 million pixels divided by 256 equals to approx. 39,000 pixels).

RGB integrated values are calculated for each of the blocks by adding separately R components, G components and B components of all the pixels that each block has and averaging them, respectively. In the embodiment, in each of the 256 blocks, RGB integrated values are outputted as 8-bit information for every R, G, and B component.

Note that, in the case of the embodiment, a ratio of respective R, G, and B pixels is R:G:B=1:2:1, and each of the blocks includes the R components=approx. 9,750 pixels, the G pixels=approx. 19,500 pixels, and the B pixels=9,750 pixels.

Then, the controller reads out calculated RGB integrated values, and calculates a gain of WB (white balance) that can achieve adequate white balance. In the AE processing, an adequate exposure amount is determined from luminance distribution, by calculating luminance of each area (block) of the picture plane. Based an the determined exposure amount, exposure conditions (number of electronic shutters of CCD, an aperture value of the aperture unit, mounting or removal of an ND filter, or the like) are set. Furthermore, in the AWB processing, a control value of AWB associated with a color of a light source of a subject is determined from RGB distribution. With this AWB processing, white balance is adjusted when conversion into YUV data is performed in the YUV converter. In addition, the AE processing and the AWB processing described above are continuously performed while monitoring.

Then, in the monitoring operation, when still image shooting operation in which the release button is pressed (from pressing the button halfway to pressing it completely) is started, the AF operation, which is the focusing position detecting operation, and still image recording processing are performed.

That is to say, when the release button is pressed (pressed halfway to pressed completely), the focus lens of the shooting lens system moves in response to a drive command from the controller to the motor driver, and, for example, the AF operation, which is so called hill-climbing AF, of a contrast evaluation method is performed.

In the so-called AF, when an AF (focusing) target area covers all regions from infinity to close-up, the focus lens of the shooting lens system moves to each focus position from close-up to infinity or infinity to close-up, and the controller reads out the AF evaluation value at each focus position that has been calculated by the CCDI/F. Then, with a point where the AF evaluation value of each focus position is maximum as a focusing position, the focus lens is moved to the focusing position, and focusing is performed.

Then, the AE processing is performed, and when exposure is complete, the mechanical shutter unit is closed in response to a drive command from the controller to the motor driver, and an analog RGB image signal for a still image is outputted from the CCD. Then, in the same manner as during monitoring, it is converted to RAW-RGB data by the A/D converter of the AFE section.

Then, in the embodiment, long-exposure-image data and short-exposure-image data are shot and synthesized into one image (a synthesizing device). In the present invention, conventional known methods can be applied to synthesizing, which includes a method for synthesizing long-exposure-image data and short-exposure-image data by adding them in all pixels and dividing the resultant data by 2 or a method for synthesizing long-exposure-image data and short-exposure-image data by performing desired weighting, or the like.

Long-exposure-image data represents data of an image photographed with exposure time equal to exposure time of when one picture is normally photographed or with exposure time which is slower than that by 1 Ev shutter speed, while short-exposure-image data represents data of an image photographed with exposure time that is 1 to 4 EV shutter speed faster than the long exposure image.

Then, after being captured into the CCDI/F of the signal processor and having white balance corrected, this RAW-RGB data (imaging signal) is converted into YUV data by the YUV converter and saved in the SDRAM by way of the memory controller. Then, the YUV data is read from the SDRAM, converted into data having a size corresponding to the number of recorded pixels by the resizing processor, and the data is compressed into image data in JPEG format, or the like by the data compressor. The compressed image data in JPEG format or the like are written back to the SDRAM, and then is read from the SDRAM by way of the memory controller, and saved in the memory card through the media I/F.

Now, white balance correction, which is a characteristic of the present invention, will be described.

(First Embodiment of White Balance Correction)

In the embodiment, white balance correction (hereinafter also referred to as WB correction) is performed on short-exposure-image data and long-exposure-image data before being synthesized, and then y correction is performed. However, when a short exposure image white balance correction factor and a long exposure image white balance correction factor, to be described later, are the same, WB correction may be performed on image data after being synthesized, if they have not been subjected to the y correction.

Figure 3:
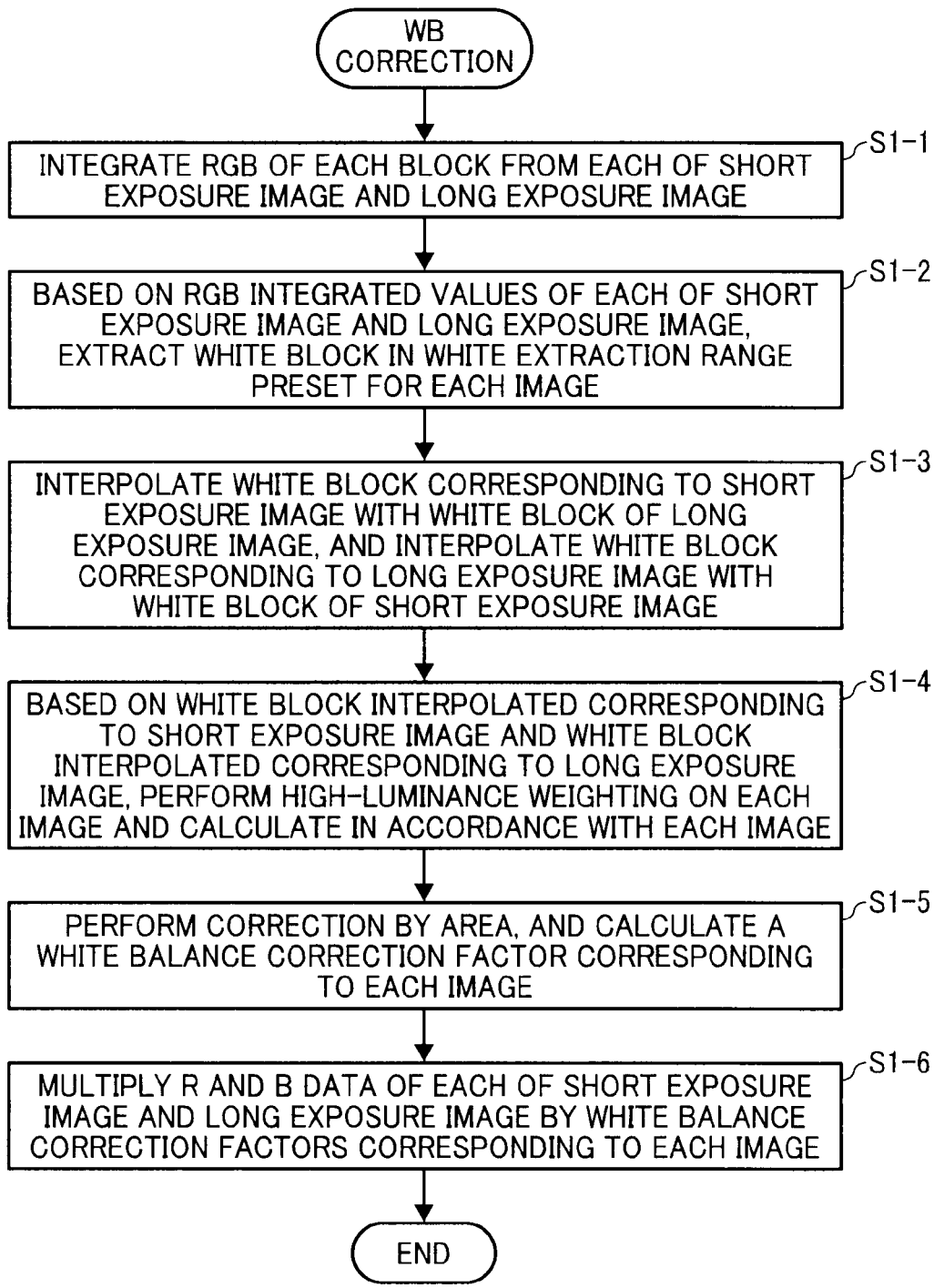
FIG. 3 is a flow chart showing, as a flow, a series of WB correction processing in the first embodiment of the imaging apparatus according to the present invention.

FIG. 3 is a flow chart showing, as a flow, a series of WB correction processing in the first embodiment of the imaging apparatus according to the present invention.

First, short-exposure-image data and long-exposure-image data are stored in SDRAM as Raw-RGB data before being subjected to signal processing.

Next, after the short-exposure-image data and the long-exposure-image data are read from the SDRAM and inputted into the CCD-I/F, each of R, G, B is integrated for each of the blocks which are obtained by dividing the picture plane in a grid pattern on the basis of the number of divisions and the size of a detection frame preset in terms of respective image data by a detection circuit in the CCD-I/F. RGB integrated values are outputted to a register which can be read by the SDRAM or CPU (S-1). In addition, a configuration may be such that Raw-RGB is directly inputted into the CCD-I/F and RGB integrated values for each of the blocks is acquired.

Furthermore, the RGB integrated values acquired for each of the blocks in each of the long-exposure-image data and the short-exposure-image data are respectively divided by the number of pixels contained in the block to obtain an RGB per pixel, which is then converted into G/R and G/B, which are an AWB evaluation value (evaluation value for short-exposure-image data white balance and evaluation value for long-exposure-image data white balance) (a White balance evaluation value acquiring device). If this AWB evaluation value falls within a white extraction range (white extraction range for short-exposure-image data and white extraction range for long-exposure-image data) preset by the white extraction range setting device, it is recorded as a white extraction block (short-exposure-image data white extraction result, long-exposure-image data white extraction result) (S1-2: a white extraction device).

Then, the white extraction range for short-exposure-image data and the white extraction range for long-exposure-image data may be the same or different, and can be set as appropriate by the white extraction range setting device, in accordance with shooting conditions.

In addition, when the white extraction range for short-exposure-image data and the white extraction range for long-exposure-image data are the same, the short-exposure-image data white extraction result and the long-exposure-image data white extraction result will be identical. Thus, the process proceeds to S1-4 without going through S1-3 to be described later. Furthermore, in this case, in S1-4 to be described later, high-luminance weighting processing is performed without using a corrected short-exposure-image data white extraction result and a corrected long-exposure-image data white extraction result.

Figure 4A:
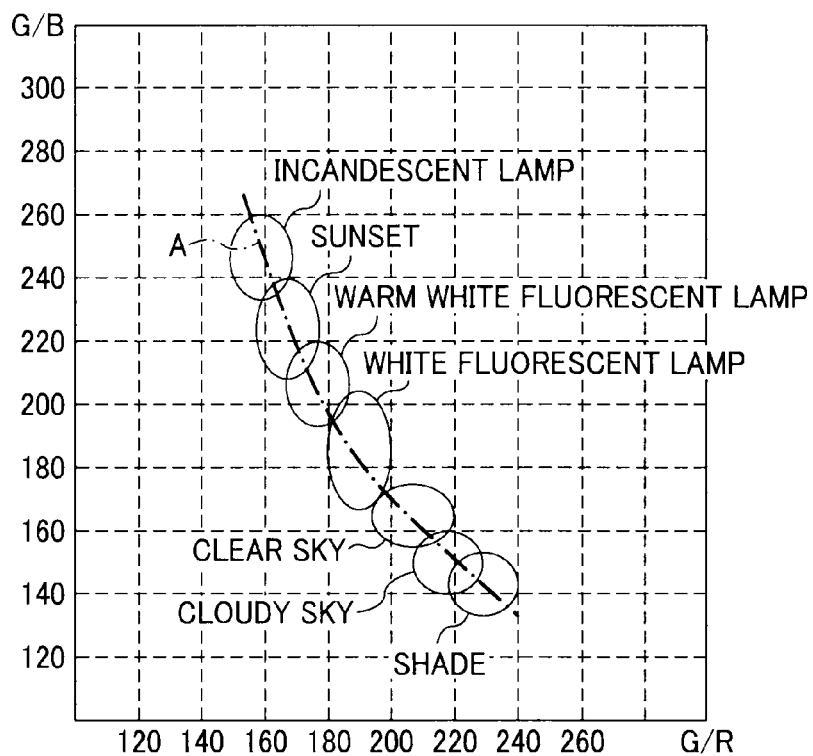
FIG. 4A is a graph showing one example of a white extraction range for short-exposure-image data in the first embodiment of the imaging apparatus according to the present invention on G/R-G/B coordinates.
Figure 4B:
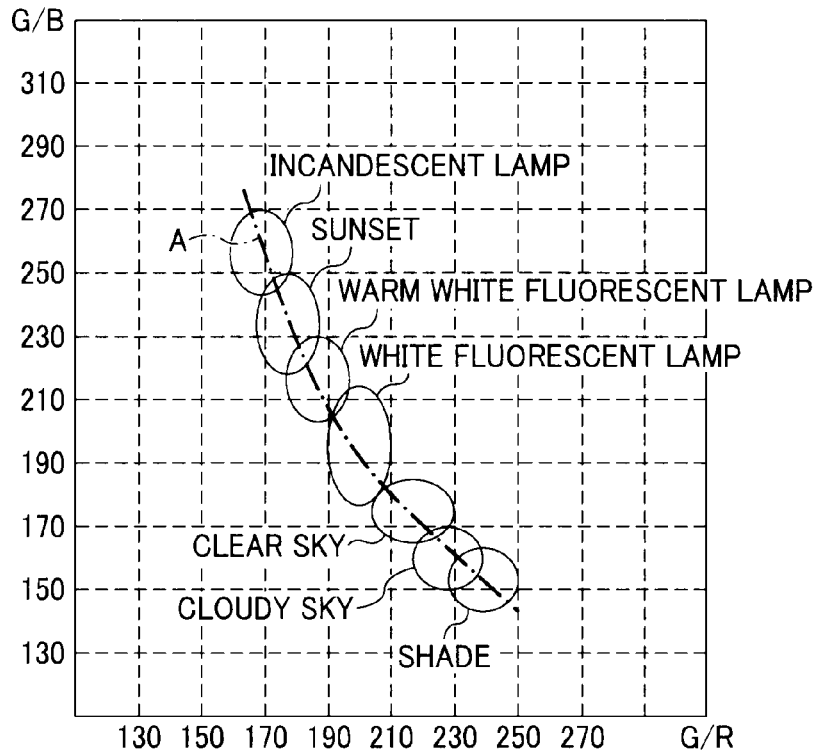
FIG. 4B is a graph showing one example of a white extraction range for long-exposure-image data in the first embodiment of the imaging apparatus according to the present invention on G/R-G/B coordinates.

Now, a white extraction range will be described. FIG. 4A is a graph showing on the G/R-G/B coordinates one example of a white extraction range for short-exposure-image data in the first embodiment of the imaging apparatus according to the present invention. In addition, FIG. 4B is a graph showing on the G/R-G/B coordinates one example of a white extraction range for long-exposure-image data in the first embodiment of the imaging apparatus according to the present invention.

As shown in FIG. 4, a white extraction range is set on the two-dimensional color coordinates with G/R as an x axis and G/B as a y axis, by multiple oval or rectangular frames along the blackbody radiation curve represented by dashed line A in FIG. 4. This white extraction range enables highly accurate white extraction to be performed across all regions from high luminance to low luminance by performing white extraction of a high-luminance part which is saturated in long-exposure-image data with use of short-exposure-image data, and a highly accurate WB gain (white balance correction factor) to be calculated by high-luminance weighting processing to be described later.

In addition, as shown in FIG. 4, comparing the white extraction range for short-exposure-image data to the white extraction range for long-exposure-image data, the white extraction range for long-exposure-image data is located to the upper right (G/B and G/R are larger) of the white extraction range for short-exposure-image data on G/R-G/B coordinates.

Then, G/R and G/B (white balance evaluation value for short-exposure-image data and white balance evaluation value for long-exposure-image data) corresponding to each white extraction block are calculated from the extracted white extraction blocks (short-exposure-image data white extraction result, long-exposure-image data white extraction result).

Next, a short exposure image white balance correction factor and a long exposure image white balance correction factor are calculated (S1-3 to S1-5; a correction factor calculating device).

To calculate the short exposure image white balance correction factor, the short-exposure-image data white extraction result and the corrected long-exposure-image data white extraction result, which has been subjected to shift processing by a short exposure conversion factor, are accumulated. In addition, to calculate the long exposure image white balance correction factor, the long-exposure-image data white extraction result and the corrected short-exposure-image data white extraction result, which has been subjected to shift processing by a long exposure conversion factor, are accumulated (S1-3).

In S1-3, the corrected short-exposure-image data white extraction result and the corrected long-exposure-image data white extraction result are calculated by using an expression (1) shown below, for example:

$$GRshort:=GRlong \times shortk$$

$$G/Bshort:=G/Blong \times shortk$$

$$G/Blong=GRshort \times longk$$

$$G/Blong=G/Bshort \times longk \tag{1}$$

where GRshort is an AWB evaluation value (G/R) of short exposure image white extraction block, G/Bshort is an AWB evaluation value (G/B) of short exposure image white extraction block, G/Blong is an AWB evaluation value (G/R) of long exposure image white extraction block, G/Blong is an AWB evaluation value (G/B) of long exposure image white extraction block, shortk is a short exposure conversion factor and longk is a long exposure conversion factor.

Now, a short exposure conversion factor is a factor of a ratio of a difference between a white extraction range for long-exposure-image data and a white extraction range for short-exposure-image data, to convert the long-exposure-image data white extraction result into the short-exposure-image data white extraction result or equivalent.

In addition, a long exposure conversion factor is a factor of a ratio of a difference between a white extraction range for long-exposure-image data and a white extraction range for short-exposure-image data, to convert the short-exposure-image data white extraction result into the long-exposure-image data white extraction result or equivalent.

Then, the high-luminance weighting processing is performed on each of the corrected long-exposure-image data white extraction result which has been shift-processed by the short-exposure-image data white extraction result and the short exposure conversion factor; and the corrected short-exposure-image data white extraction result which has been shift-processed by the long-exposure-image data white extraction result and the long exposure factor. After that, the corrected long-exposure-image data white extraction result and the corrected short-exposure-image data white extraction result are accumulated (S1-4).

The high-luminance weighting processing performs weighting according to average luminance of each white extraction block of the short-exposure-image data white extraction result and the corrected long-exposure-image data white extraction result, and the long-exposure-image data white extraction result and the corrected short-exposure-image data white extraction result, on G/R and G/B (each of the white balance evaluation value for short-exposure-image data and the white balance evaluation value for long-exposure-image data) of the white extraction block. Following this, they are accumulated, and after S1-5 to be described later, a short exposure image white balance correction factor per pixel and a long exposure image white balance correction factor per pixel are calculated.

The expression for the high-luminance weighting processing is the following expression (2):

$$R_{gain} = \sum_{j=1}^{n}(GR_j \times Yave_j)/(Cnt + Yave_j)$$
$$B_{gain} = \sum_{j=1}^{n}(GB_j \times Yave_j)/(Cnt + Yave_j)$$
(2)

where GR is an AWB evaluation value of white extraction block (G/R), GB is an AWB evaluation value of white extraction block (G/B), Yave is an average luminance of white extraction block, Cnt is a number of white extraction blocks, and n is the number of white extraction blocks.

However, in the expression (2), in order to eliminate a luminance difference in image data white extraction results due to the short-exposure-image data and the long-exposure-image data having different exposure time, using a difference based on AE control values (shutter speed, aperture value, AGC) of when each image is shot, a luminance value (average luminance value in each white extraction block) of the short-exposure-image data white extraction result is converted into a relative value based on a luminance value (average luminance value in each white extraction block) of the long-exposure-image data white extraction result. In addition, a luminance value of the long-exposure-image data white extraction result is converted into a relative value based on a luminance value of the short-exposure-image data white extraction result. Any of these conversions is performed using the expression (3) shown below. In addition, FIG. 5 shows the AE control values.

In addition, in the expression (3) below, when a luminance value of the short-exposure-image data white extraction result is converted into a relative value based on a luminance value of the long-exposure-image data white extraction result, it is calculated with deltaEv of an exponent part as positive, or with deltaEv as negative when vice versa.

$$\text{delta}Ev := \{(1Tv - sTv) + (1Av - sAv) + (1AGC - sAGC)\}/16$$
$$Yave = Yave \times 2^{\pm deltaEv}$$
(3)

where sTv is a shutter speed of short exposure image, aAv is an aperture value of short exposure image, aAGC is an AGC of short exposure image, lTv is a shutter speed of long exposure image, lAv is an aperture value of long exposure image, lAGC is an AGC of long exposure image, deltaEv is an Ev difference, Yave is an average luminance of white extraction block (after being converted), Yave' is an average luminance of white extraction block (before being converted).

In addition, both a luminance value of the short-exposure-image data white extraction result (average luminance value in each white extraction block) and a luminance value of the long-exposure-image data white extraction result (average luminance value in each white extraction block) are expressed by the following expression (4):

$$Yave = R \times 0.299 + G \times 0.587 + B \times 0.114$$
(4)

After the high-luminance weighting processing and addition in the S1-4, separately for each pixel, correction is made to every area on the color coordinates of G/R and G/B, to make the luminance value of the short-exposure-image data white extraction result and the luminance value of the long-exposure-image data white extraction result a short exposure image white balance correction factor and a long exposure image white balance correction factor (S1-5). The area-to-area correction device that, for example, in a scene on the low color temperature side in which a G/R value is small and a G/B value is great, G/R is increased and G/B is reduced so that a light source color remains, or in a scene on the high color temperature side in which a G/R value is great and a G/B value is small, limit processing is performed if the G/R is greater than a certain level.

A white balance correction processing is performed by multiplying R, B data of the short-exposure-image data by the short exposure image white balance correction factors (corresponding to each of the R, B), and by multiplying R, B data of the long-exposure-image data by the long exposure image white balance correction factors (corresponding to each of the R, B) (S1-6: a white balance correcting device).

(Second Embodiment of White Balance Correction)

Figure 6:
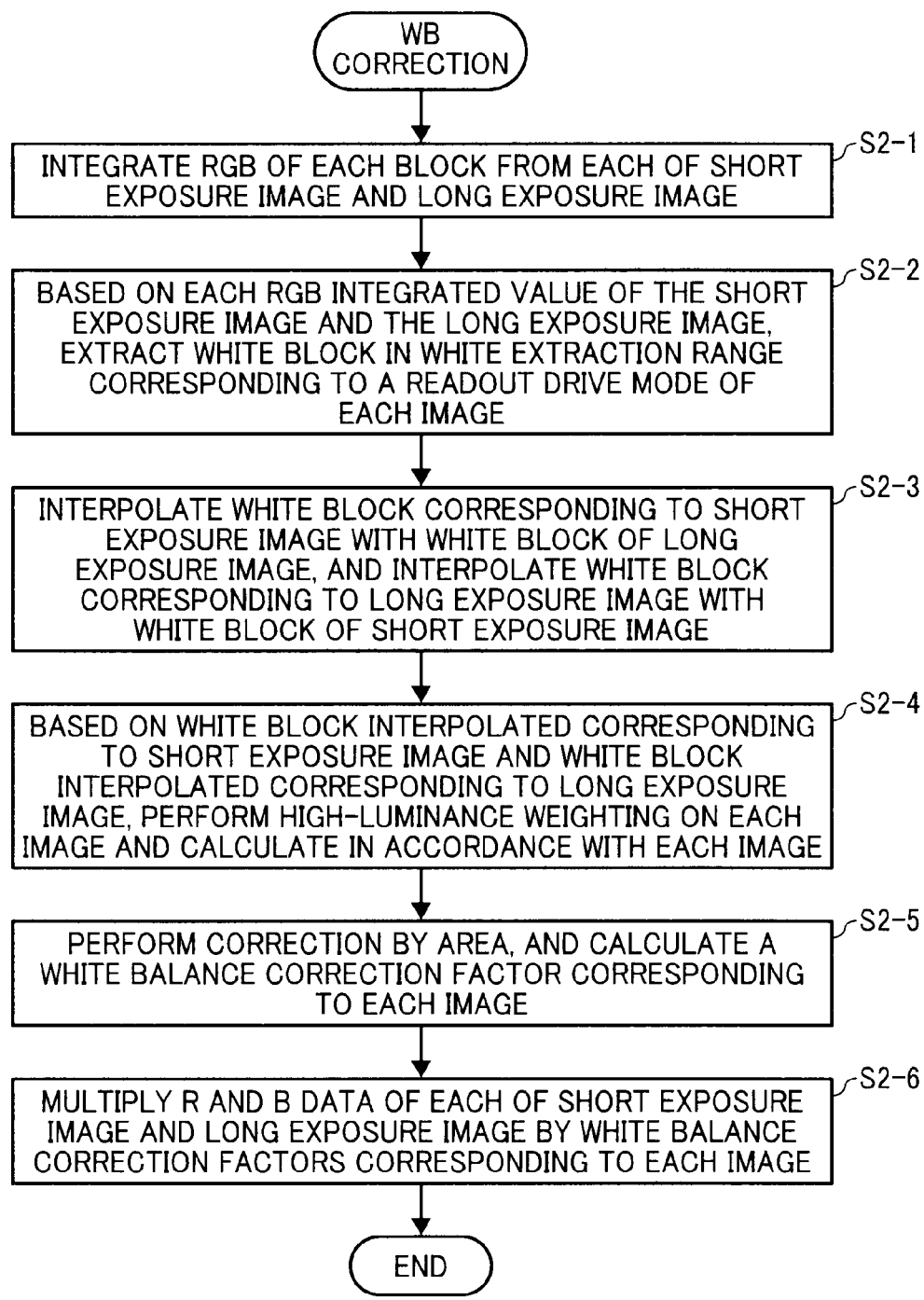
FIG. 6 is a flow chart showing a flow of a series of WB correction processing in a second embodiment of the imaging apparatus according to the present invention.

FIG. 6 is a flow chart showing, as a flow, a series of WB correction processing in a second embodiment of the imaging apparatus according to the present invention.

Although the first embodiment includes the case in which a white extraction range is the same for short-exposure-image data and long-exposure-image data, a white extraction range differs respectively in short-exposure-image data and long-exposure-image data in the present embodiment. Thus, the present embodiment is the same as the first embodiment except that they are different in S1-2 and S2-2. In other words, S1-1 is an identical step to S2-1, and S1-3 to S1-6 are identical steps to S2-3 to S2-6.

In synthesis by shooting two images, a problem is image misalignment due to a camera shake or a subject movement. In order to minimize this, in short exposure image shooting, an imager (image pickup element) readout drive mode is switched to a readout mode by adding horizontal/vertical 2 pixels to read out data in a high speed. Although this can halve a data rate and enable a high speed readout, a voltage to be applied to the imager should be switched to the setting in conformity with the readout mode by adding the horizontal/vertical 2 pixels. However, in accordance with a voltage to be applied to the imager, R component, G component and B component of a signal to be outputted vary even when the same subject is shot.

Therefore, in the embodiment, white extraction is performed by retaining multiple white extraction ranges corresponding to respective readout drive modes, and using a white extraction range corresponding to a readout drive mode at the time of shooting.

Accordingly, when a short exposure image is shot, white extraction is performed by using a white extraction range (white extraction range for short-exposure-image data) corresponding to a readout mode at the time of short exposure image, and white extraction is performed by using a white extraction range (white extraction range for long-exposure-image data) corresponding to a readout drive mode at the time of long exposure image, when a long exposure image is shot (S2-2).

This allows stable white extraction even when a readout drive mode is switched in a short exposure image and a long exposure image.

(Third Embodiment of White Balance Correction)

Figure 7:
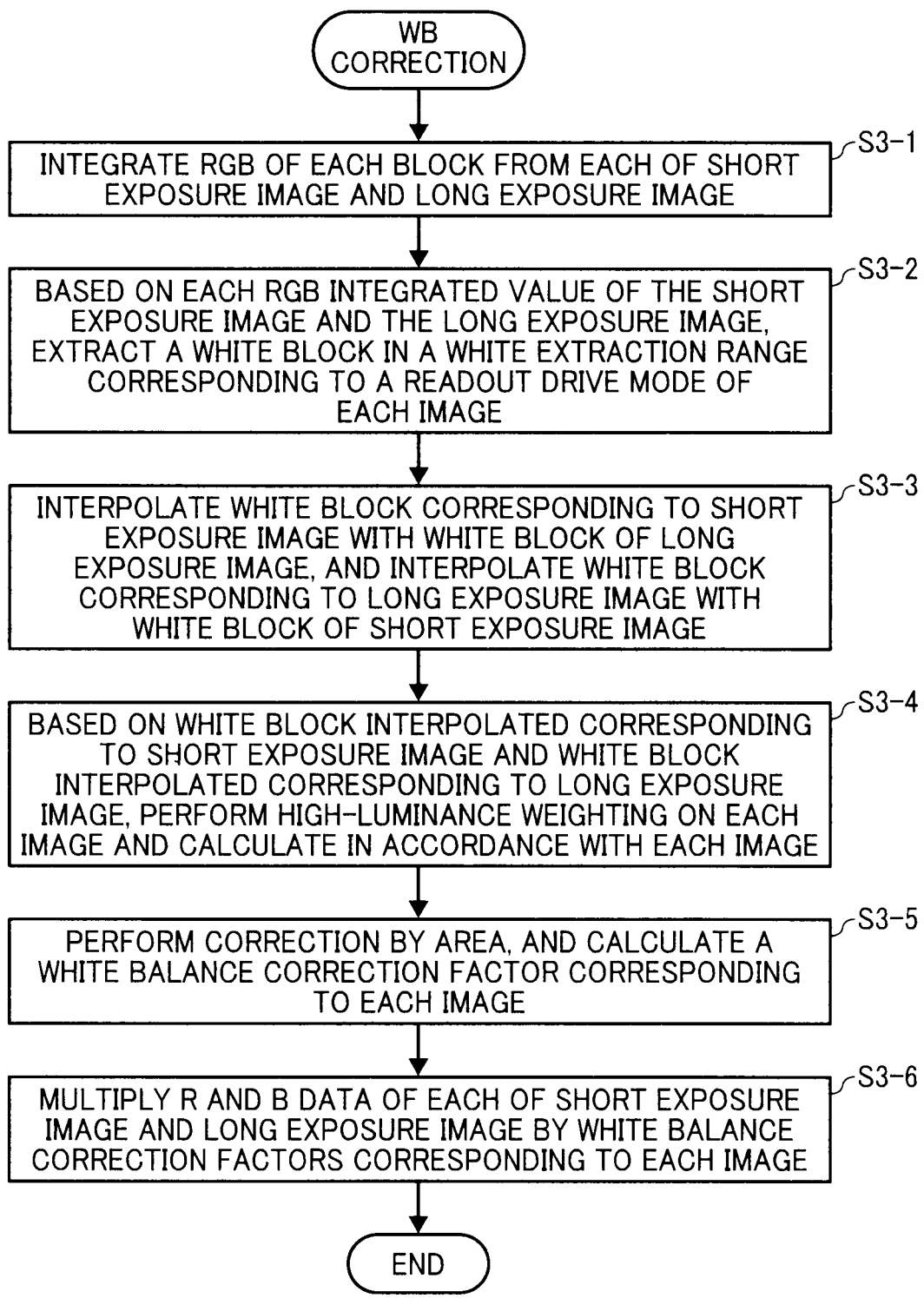
FIG. 7 is a flow chart showing a flow of a series of WB correction processing in a third embodiment of the imaging apparatus according to the present invention.

FIG. 7 is a flow chart showing, as a flow, a series of WB correction processing in a third embodiment of the imaging apparatus according to the present invention.

Although the first embodiment includes the case in which a white extraction range is the same for short-exposure-image data and long-exposure-image data, a white extraction range differs respectively in short-exposure-image data and long-exposure-image data in the present embodiment. Thus, the present embodiment is the same as the first embodiment except that they are different in S1-2 and S3-2. In other words, S1-1 is an identical step to S3-1, and S1-3 to S1-6 are identical steps to S3-3 to S3-6.

In synthesis by shooting two images, a problem is image misalignment due to a camera shake or a subject movement. In order to minimize this, in short exposure image shooting, a drive frequency of the imager (image pickup element) is switched to read out data in a high speed. However, an optimal sampling position for capturing a signal to be outputted from the imager varies, in accordance with a drive frequency of the imager. Then, if a sampling position changes, a signal to be subsequently A/D converted and outputted also changes. Thus, even when the same subject is imaged, R component, G component, and B component of a signal to be outputted will vary, in accordance with respective drive frequencies.

Figure 8A:
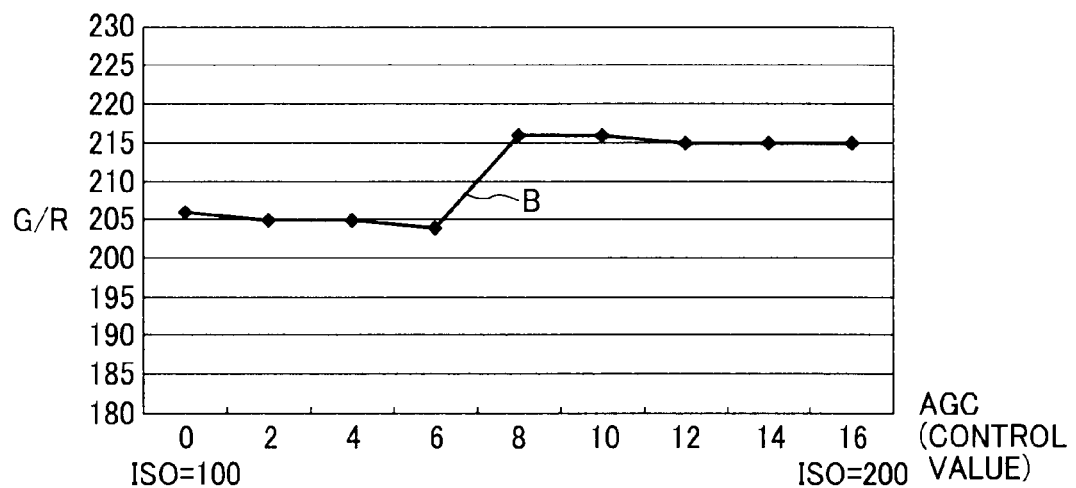
FIG. 8A is a graph showing one example of a relation between G/R and AGC.
Figure 8B:
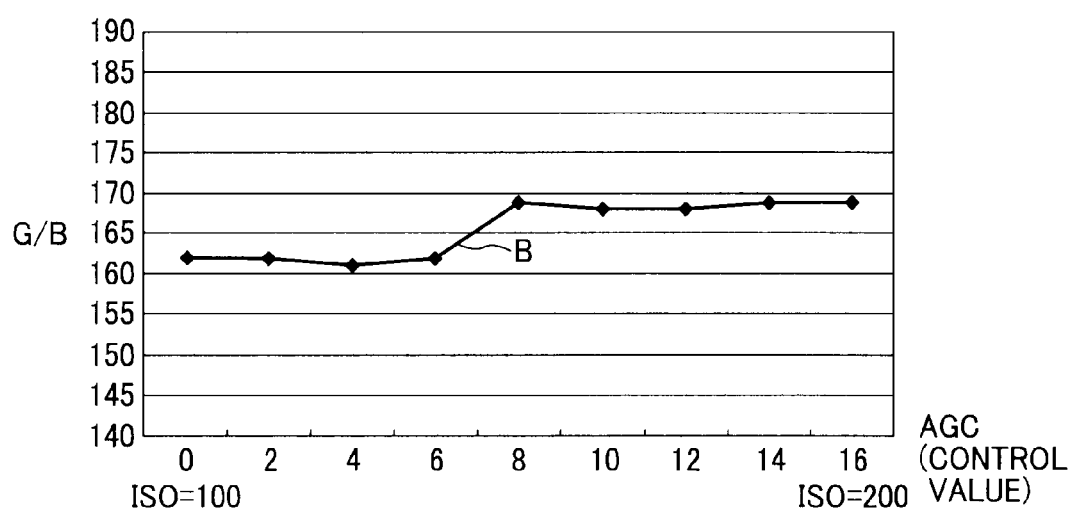
FIG. 8B is a graph showing one example of a relation between G/B and AGC.

FIG. 8A is a graph showing one example of a relation of G/R, and AGC in a third embodiment. FIG. 8B is a graph showing one example of a relation of G/B and AGC in the third embodiment.

Both in FIG. 8A and FIG. 8B, the vertical axis represents a value determined by centuplicating a value of G divided by R or B, and the horizontal axis represents a control value and an ISO value. This means that an amplification ratio at a point for a control value 0 (ISO=100) is a double of that at a point for a control value 16 (ISO=200) on the horizontal axis.

According to FIG. 8, it can be confirmed that G/R and G/B widely change before and after the point B representative of a switching point of a sampling position. In the embodiment, multiple white extraction ranges corresponding to a sampling position are retained, and white extraction is performed by using a corresponding white extraction range according to a sampling position at the time of shooting.

Thus, when a short exposure image is shot, white extraction is performed by using a white extraction range (white extraction range for short-exposure-image data) corresponding to the short exposure image (S3-2).

Since an optimal white extraction range varies depending on a wiring pattern or an impedance of a board, adjustment to an optimal value needs to be made according to them.

This enables stable white extraction to be performed even when a drive frequency of the imager is switched in a short exposure image and a long exposure image.

(Fourth Embodiment of White Balance Correction)

Figure 9:
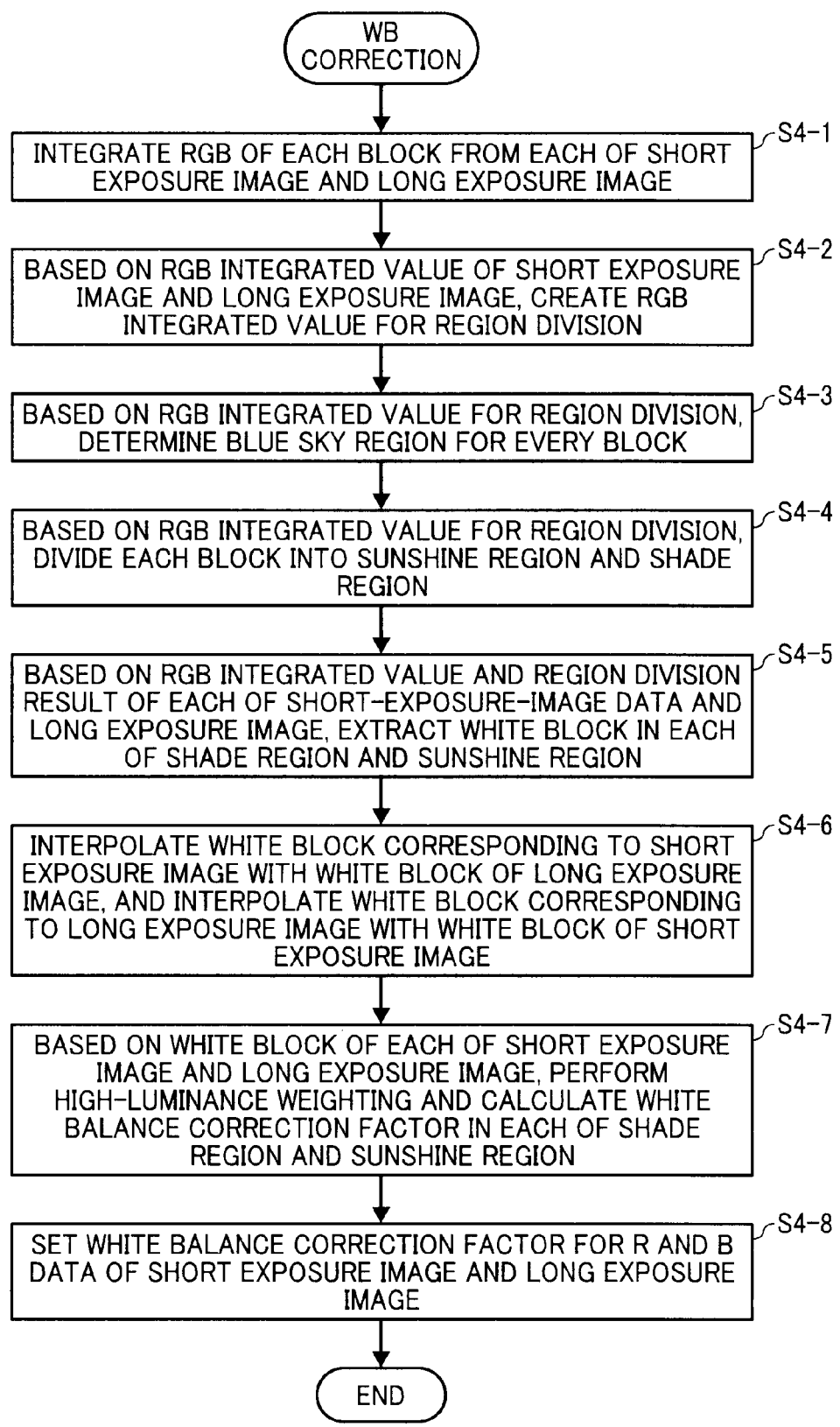
FIG. 9 is a flow chart showing a flow of a series of WB correction processing in a fourth embodiment of the imaging apparatus according to the present invention.

FIG. 9 is a flow chart showing, as a flow, a series of WB correction processing in a fourth embodiment of the imaging apparatus according to the present invention.

Since acquisition of RGB integrated values of S4-1 in the embodiment is identical to S1-1 in the first embodiment described above, a description is omitted.

(S4-2; Creating RGB Integrated Value for Division of Regions)

Next, RGB integrated values are prepared for a blue sky region determination, and region division into a sunshine region and a shade region.

That is, the imaging apparatus according an embodiment of the present invention may include a sunshine/shade region division device configured to perform division of the short-exposure-image data and the long-exposure-image data into a sunshine region and a shade region.

RGB integrated values to be entered in the blue sky region determination, and the region division into the sunshine region and the shade region include short-exposure-image data and long-exposure-image data, and a part acquired from the long-exposure-image data are used for a low-luminance part, while a part acquired from the short-exposure-image data is used for a high-luminance part.

To be specific, of 16×16=256 blocks for each of the short-exposure-image data and the long-exposure-image data, the long-exposure-image data is selected for blocks which satisfy the following expression (5), the short-exposure-image data is selected for blocks which do not satisfy the following expression (5), and therefore 256 blocks to be divided into the regions are created. In addition, in the embodiment, since a preferred embodiment is exemplified, the long-exposure-image data is selected for the blocks satisfying the following expression (5). However, the present invention should not be limited to this, and may be such that long-exposure-image data or short-exposure-image data can be selected.

Figure 10:
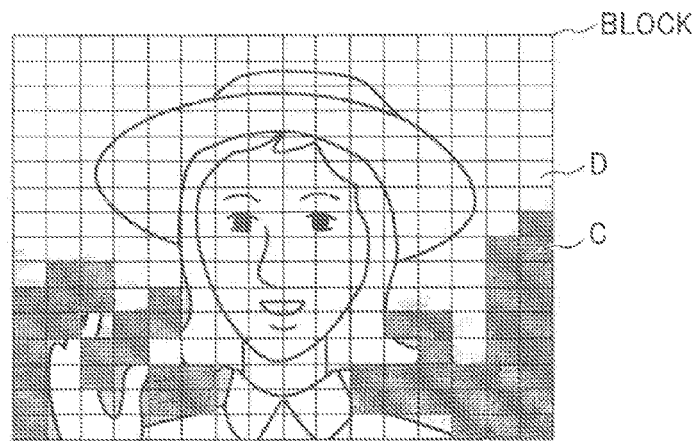
FIG. 10 is an illustration diagram showing specific examples of a low-luminance part and a high-luminance part.

FIG. 10 shows an example. A block C filled in gray satisfies the following expression (5) and RGB integrated values for the long-exposure-image data are used. A block D does not satisfy the following expression (5) and RGB integrated values for the short-exposure-image data are used.

$$Y<Y_{thre} \qquad (5)$$

(S4-3; Blue Sky Region Determination)

Next, a blue sky region determination is made on RGB integrated values for each acquired block. In the blue sky region determination, by determining whether or not a block having high B component exists in the blocks, it is determined whether or not that block is a blue sky region. As a specific example of such a determination, a block in which $G/R>=2$ and $G/B<=1.5$ is determined as a blue sky region.

(S4-4; Sunshine/Shade Region Division)

Then, the blocks are divided into the regions, that is, each block is grouped into a sunshine region or a shade region (sunshine/shade region division), according to a luminance value (Y) based on the RGB integrated values and the RGB integrated values. In the embodiment, by grouping each block into two regions consisting of the sunshine region and the shade region, an entire picture plane is divided into two. However, the present invention should not be limited to this. That is to say, it shall not be limited, in particular, if in a shot image divided into n blocks, the n blocks may be integrated to be m blocks, that is, the shot image may be divided into m regions (however, $n > m \geq 2$ should be satisfied).

In the embodiment, the luminance value (luminance signal) Y is calculated by using the expression (4) above. In addition, a color difference signal U (Cb) and a color difference signal V (Cr) can be calculated by using the following expressions (6) and (7).

$$U = -0.169 \times R - 0.3316 \times G + 0.500 \times B \qquad (6)$$

$$V = 0.500 \times R - 0.4186 \times G - 0.0813 \times B \qquad (7)$$

Now, a specific method for performing division into sunshine/shade regions will be illustrated by an example hereinafter. Note that it is needless to say that the present invention should not be limited to the following example at all.

To perform division into sunshine/shade regions, each block is grouped into the sunshine region or the shade region according to the conditions for division with use of the luminance value Y and R/B, which is a ratio of a red component value R to a blue component value B to be calculated from the RGB integrated values.

Figure 11:
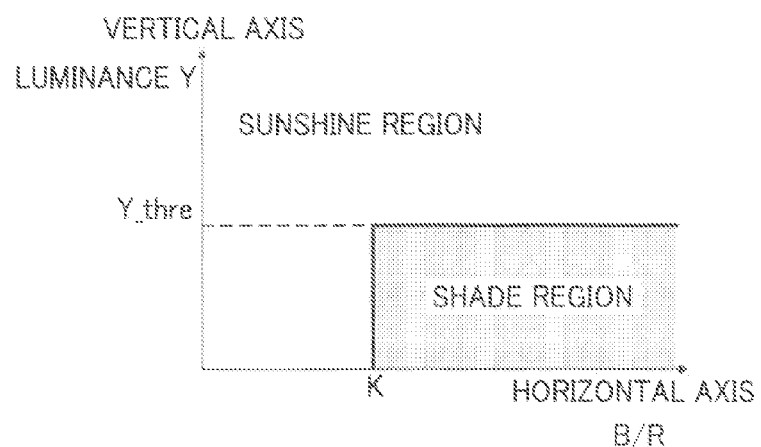
FIG. 11 is a correlation diagram of a luminance value Y, and a ratio of a blue component to a red component B/R.

A specific example of the conditions for division will be described. FIG. 11 shows a specific example of dividing the blocks into the sunshine region and the shade region according to the above expression (5) and an expression (8) shown below.

In FIG. 11, the vertical axis represents a luminance value Y, and the horizontal axis represents a ratio B/R.

$$B/R > K \qquad (8)$$

That is to say, in the embodiment, any block which does not satisfy at least either the above expression (5) or (8) is determined as sunshine, while any block which satisfies both (5) and (8) is determined as shade, and the above expressions (5) and (8) are stored as the conditions for division in the imaging apparatus. Then, for each block divided in S4-1, the sunshine/shade region division is performed by determining whether the block is a sunshine region or a shade region, by using the luminance value Y calculated from RGB integrated values and the ratio R/B of the R/B integrated values.

In the embodiment, the sunshine/shade division is performed, given $K=2$ (an integrated value of B pixels is greater than a double of an integrated value of R pixels), and Ythre=100 (however, this is a value in 8 bit data (0 to 255)).

The embodiment can provide the highly accurate sunshine/shade region division, by performing the sunshine/shade region division on the basis of (a part of) short-exposure-image data and (a part of) long-exposure-image data. That is to say, for any region where favorable sunshine/shade division cannot be performed only with short-exposure-image data or only with long-exposure-image data, the highly accurate sunshine/shade region division can be provided through mutual interpolation.

Then, after this, in the embodiment, a blue sky region is determined in S4-3, and a block which is determined as a shade region in the sunshine/shade region division is changed to a sunshine region. Since this can prevent WB for a shade region from being applied to blue sky, the WB processing with high accuracy can be performed.

Furthermore, continuity of the RGB integrated values on adjacent blocks is determined in each block, and a very small region existing in a large region is changed to a region belonging to the large region. That is to say, in the case in which a very small shade region exists in a large sunshine region, the same WB can be applied to some combined regions by applying the same WB as the large sunshine region, even to the very small shade area (This holds true even when sunshine and shade are reversed). That is to say, natural WB can be applied even in the case in which small sunshine regions or shade regions are mixed together.

Figure 12:
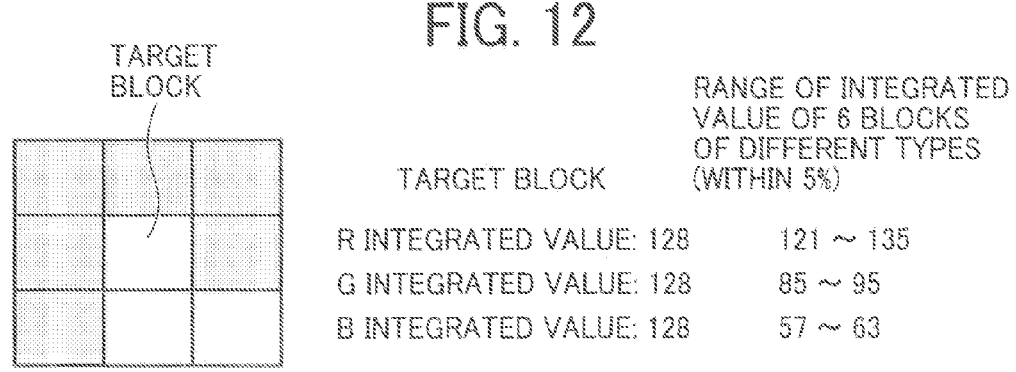
FIG. 12 is a schematic view showing one example of a very small area existing in a large area.

To be specific, as shown in FIG. 12, when, out of 8 blocks surrounding one block which is a target of the determination, 6 blocks are different types of regions from the one block according to the sunshine/shade region determination result of the one block, continuity of RGB integrated values is determined.

For the continuity of the RGB integrated values, RGB integrated values of the 6 blocks and those of the one block are compared. When a discrepancy between the RGB integrated values of the 6 blocks and those of the one block is within 5%, it is determined that there is continuity, and the sunshine/shade determination result of the one block is replaced with determination result identical to that of the 6 blocks. FIG. 12 also shows one example of a relation of the range of integrated value of then the target block and the 6 blocks of different types.

Then, furthermore, on the shot image which has been subjected to the sunshine/shade region division, by further using focusing information, a very small region in each block obtained in S4-1 may be integrated into a large region, according to the focusing information.

In addition, focusing information mentioned herein is information that uses the AF evaluation value.

During the AF operation, the AF evaluation value is acquired for each of blocks obtained by dividing the shot image into horizontally 16 blocks and vertically 16 blocks. In the each block, if a focus position where the AF evaluation value is maximum is identical to a focus position that was made to be the focusing position during the AF operation, that block is made to be a focusing block, and if not, that block is made to be a defocusing block.

Figure 13:
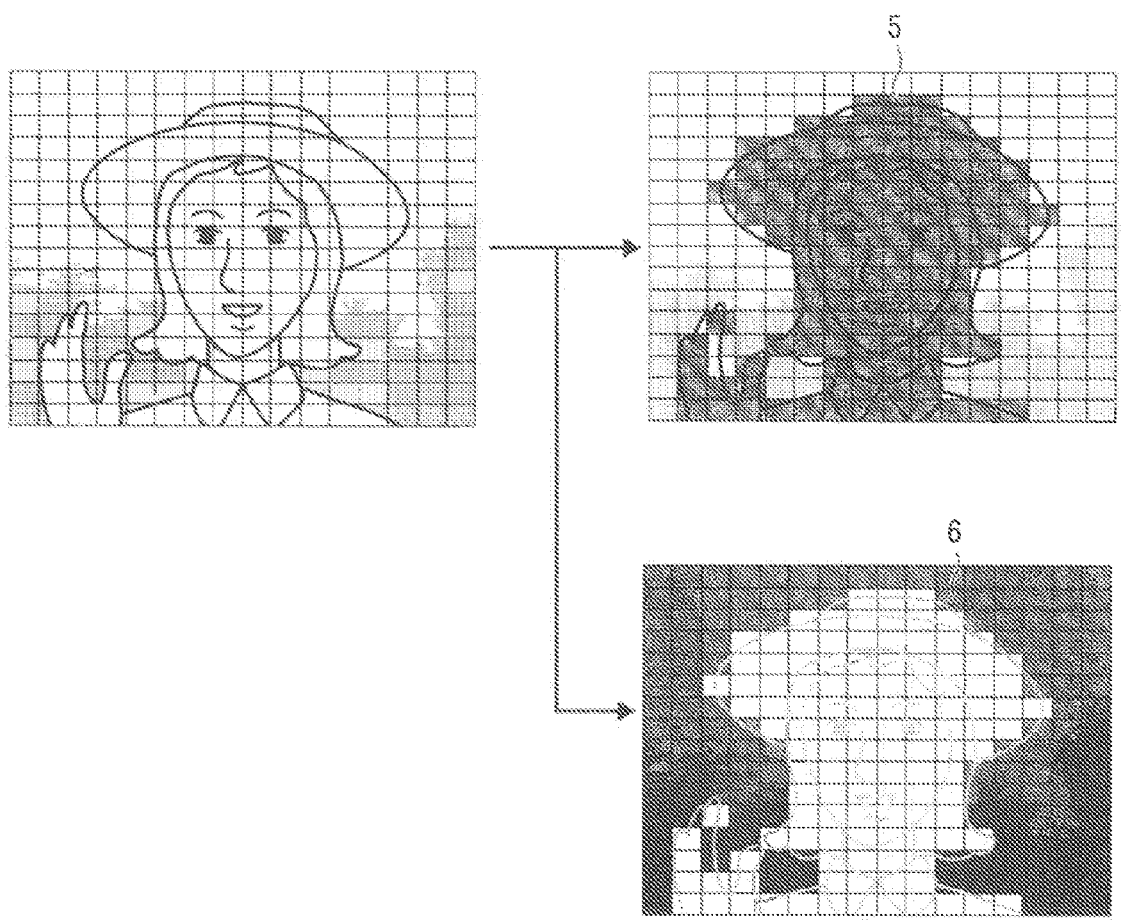
FIG. 13 is an illustration diagram showing a pattern diagram in which an imaging signal in the first embodiment of the imaging apparatus according to the present invention is divided into grid-like blocks, and illustrating a subject area and a background area in the pattern diagram.

FIG. 13 includes views showing the region division performed in units of the blocks, in which a subject region 5 is the focusing blocks and a background region 6 is the defocusing blocks.

As a method for integrating regions by using the focusing information, if the sunshine/shade region determination result of one block which is a target of determination is a different type of region from any of two blocks arranged above or below or to the right and left of the one block, operation of integrating regions is performed by using the focusing information.

To be specific, when the one block is the focusing block, and the two blocks arranged above or below or to the right or left of the one block are also the focusing block, the sunshine/shade region determination result of the one block is replaced with the determination result identical to that of the two blocks.

(S4-5; White Block Extraction)

For white extraction of each of long-exposure-image data and short-exposure-image data, RGB integrated values by block are converted into G/R, and G/B, and when they are within a preset white extraction range, the block is stored as a white extraction block. Then, in the embodiment, based on the region division result, white extraction is performed by changing a white extraction range in each of the shack region and sunshine region.

Specifically, the white extraction range for short-exposure-image data includes a sunshine region white extraction range for short-exposure-image data corresponding to the sunshine region and a shade region white extraction range for short-exposure-image data corresponding to the shade region, and the white extraction range for long-exposure-image data includes a sunshine region white extraction range for long-exposure-image data corresponding to the sunshine region and a shade region white extraction range for long-exposure-image data corresponding to the shade region.

Thus, favorable white extraction can be performed by changing a white extraction range in a sunshine region and a shade region, and making it a white extraction range suitable for each region.

As stated in the first embodiment above, a white extraction range is set by multiple elliptical or rectangular frames along a blackbody radiation curve shown by the dotted line A on a two-dimensional color coordinate with G/R as an x axis and G/B as a y axis, as shown in FIG. 4. In addition, it is preferable that a white extraction range for short-exposure-image data and a white extraction range for long-exposure-image data are different as respectively shown in FIG. 4A and FIG. 4B.

This enables highly accurate white extraction to be performed across all regions from high luminance to low luminance by performing white extraction of a high-luminance part which is saturated in long-exposure-image data with use of short-exposure-image data, and a highly accurate WB gain to be calculated by high-luminance weighting processing to be described later.

Furthermore, in the embodiment, in the region as shown in FIG. 4, for example, a region corresponding to approximately 2300K to approximately 5800K shall be a sunshine region white extraction range (for short-exposure-image data and for long-exposure-image data), and a region corresponding to approximately 5800K to approximately 8000K shall be a shade region white extraction range (for short-exposure-image data and for long-exposure-image data).

(S4-6 to S4-8: Correction of White Extraction Result, and Calculation/Setting of White Balance Correction Factor)

Next, a short exposure image white balance correction factor and a long exposure image white balance correction factor will be calculated.

To calculate a short exposure image white balance correction factor, a short-exposure-image data white extraction result and a corrected long-exposure-image data white extraction result which has been shift processed with a short exposure conversion factor are integrated. In addition, to calculate a long exposure image white balance correction factor, a long-exposure-image data white extraction result and a corrected short-exposure-image data white extraction result which has been shift processed with a long exposure conversion factor are integrated.

However, then, a short exposure image white balance correction factor is separately calculated in each of a sunshine region and a shade region, and a long exposure image white balance correction factor is also separately calculated in each of a sunshine region and a shade region.

That is to say, in the embodiment, steps similar to S1-3 to S1-5 in the first embodiment above are performed in each of a sunshine region and a shade region.

In the following, S4-6 to S4-8 will be described in detail in comparison with S1-3 to S1-5 above.

S4-6

In the embodiment, a corrected short-exposure-image data white extraction result and a corrected long-exposure-image data white extraction result are calculated by using the expression (1) as in S1-3 above.

However, the embodiment is different from S1-3 above in that the short-exposure-image data white extraction result is independently calculated in each of separated sunshine region and shade region, and that the long-exposure-image data white extraction result is independently calculated in each of separated sunshine region and shade region. Thus, the corrected short-exposure-image data white extraction result is separately outputted to the sunshine region and the shade region, and the corrected long-exposure-image data white extraction result is separately outputted to the sunshine region and the shade region.

S4-7

After that, each of the short-exposure-image data white extraction result and the corrected long-exposure-image data white extraction result which has been shift processed with the short exposure conversion factor, and the long-exposure-image data white extraction result and the corrected short-exposure-image data white extraction result which has been shift processed with the long exposure conversion factor is subjected to the high-luminance weighting processing, and then they are integrated. This integration is performed by using the above expression (2) as in S1-4 above. Following this, after S4-8 to be described later, a short exposure image white balance correction factor per pixel and a long exposure image white balance correction factor per pixel are calculated. They shall be WB correction factors, which are Rgain and Bgain.

However, the embodiment differs from S1-4 above in that, when G/R and G/B of each white extraction block of the short-exposure-image data white extraction result and the corrected long-exposure-image data white extraction result, and the long-exposure-image data white extraction result and the corrected short-exposure-image data white extraction result is weighted by average luminance of the white extraction block, calculation is independently performed in each of the separated sunshine region and the shade region. Accordingly, for weighting by average luminance, weighting is performed in a sunshine region or a shade region to which the white extraction block belongs to, and not performed in any region to which the white extraction block does not belong to.

At this time, it is preferable that a luminance value is then adjusted by using the expression (3), as in the first embodiment described above.

S4-8

After the high-luminance weighting processing and the integration are performed in S4-7, by independently making an area-to-area correction to G/R and G/B for every pixel on the color coordinate, a short exposure image white balance correction factor and a long exposure image white balance correction factor are determined. The specific calculation of the short exposure image white balance correction factor and the long exposure image white balance correction factor is the same as shown in S1-5 above.

However, it is preferable to calculate them independently on separated sunshine region and shade region, and the embodiment differs from S1-5 above in this regard.

(Fifth Embodiment of White Balance Correction)

Figure 14:
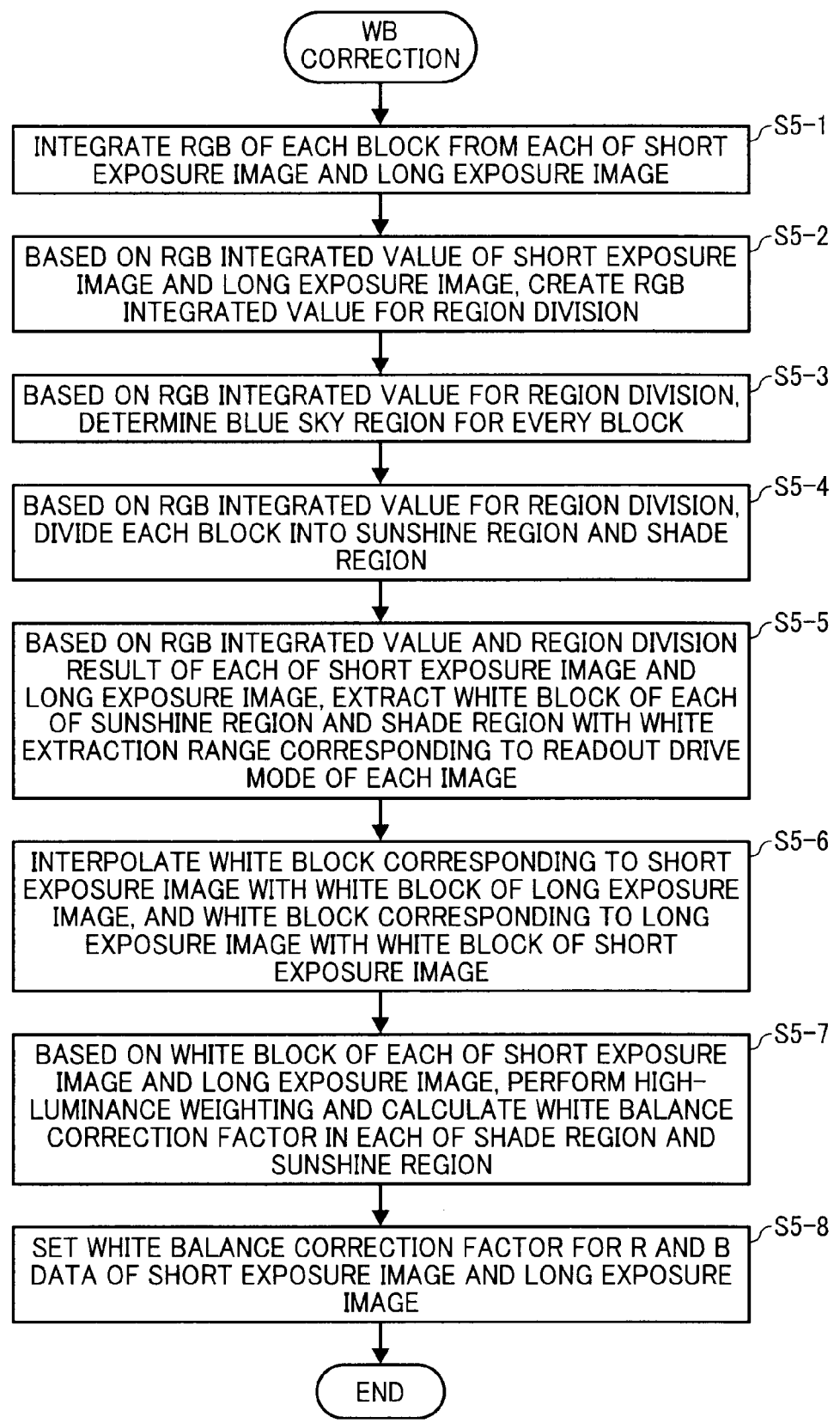
FIG. 14 is a flow diagram showing a flow of a series of WB correction processing in a fifth embodiment of the imaging apparatus according to the present invention.

FIG. 14 is a flow chart showing, as a flow, a series of WB correction processing in a fifth embodiment of the imaging apparatus according to the present invention.

Note that the embodiment is the same as the fourth embodiment except that they are different in S4-5 and S5-5. That is to say, as steps S4-1 to S4-4 are the same as S5-1 to S5-4, and S4-6 to S4-8 are the same as S5-6 to S5-8, description thereof will be omitted.

In the embodiment, (as in the second embodiment described above), multiple white extraction ranges corresponding to a readout drive mode are retained, and white extraction is performed by using a corresponding white extraction range according to a readout drive mode at the time of shooting.

Thus, when a short exposure image is shot, white extraction is performed by using a white extraction range (white extraction range for short-exposure-image data) corresponding to a readout drive mode at the time of short exposure image, and white extraction is performed by using a white extraction range (white extraction range for long-exposure-image data) corresponding to a readout drive mode at the time of long exposure image when a long exposure image is shot (S5-5).

This enables stable white extraction to be performed even when a readout drive mode is switched in the short exposure image and the long exposure image.

(Sixth Embodiment of White Balance Correction)

Figure 15:
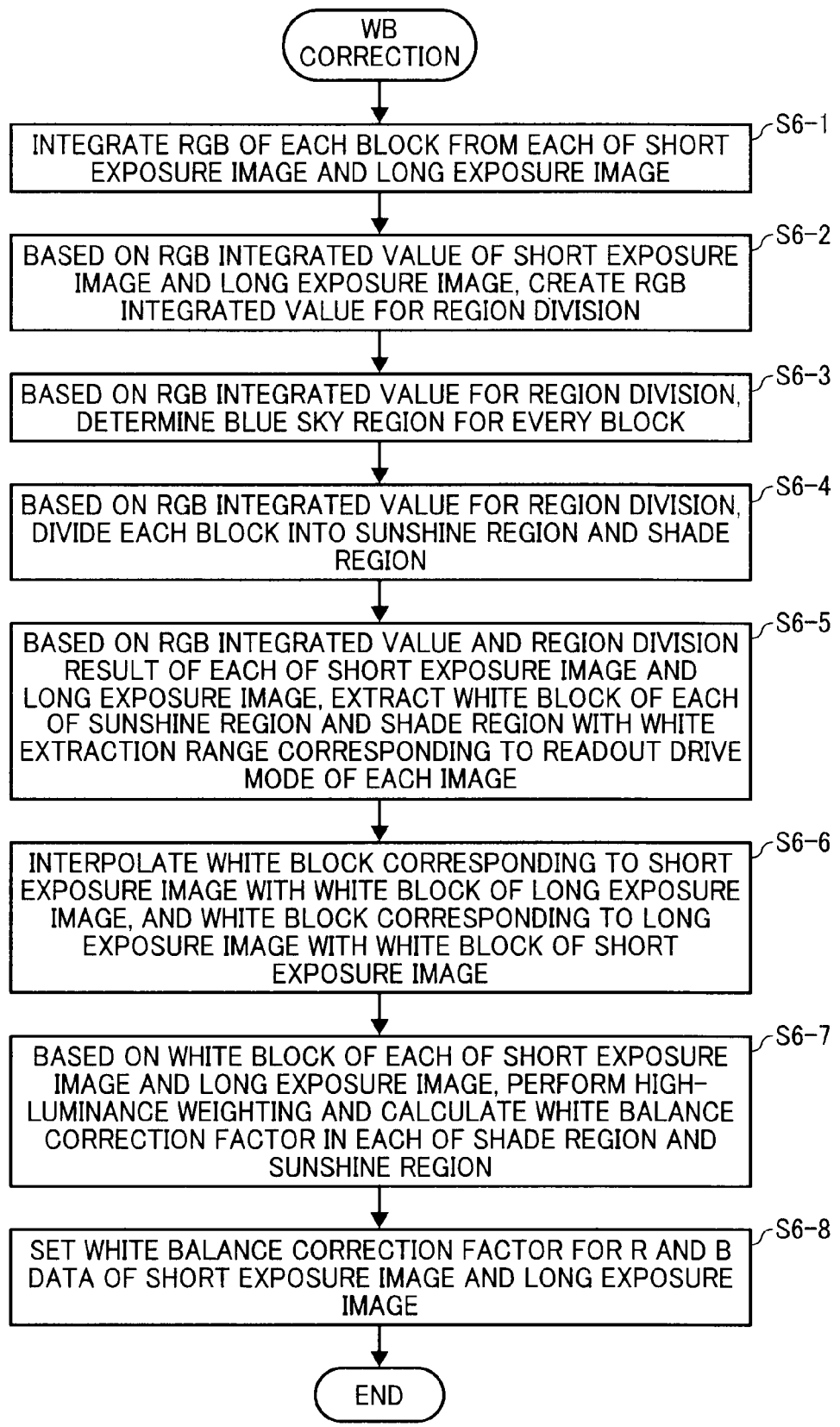
FIG. 15 is a flow diagram showing a flow of a series of WB correction processing in a sixth embodiment of the imaging apparatus according to the present invention.

FIG. 15 is a flow chart showing, as a flow, a series of WB correction processing in a sixth embodiment of the imaging apparatus according to the present invention.

Note that the embodiment is the same as the fourth embodiment except that they are different in S4-5 and S6-5. That is to say, as steps S4-1 to S4-4 are the same as S6-1 to S6-4, and S4-6 to S4-8 are the same as S6-6 to S6-8, description thereof will be omitted.

In the embodiment, (as in the third embodiment described above), when a short exposure image is shot, white extraction is performed by using a white extraction range corresponding to the short exposure image (white extraction range for short-exposure-image data) (S6-5).

Since an optimal white extraction range varies depending on a wiring pattern or an impedance of a board, adjustment to an optimal value needs to be made according to them.

This enables stable white extraction to be performed even when a drive frequency of the imager is switched in a short exposure image and a long exposure image.

(Seventh Embodiment of White Balance Correction)

Figure 16:
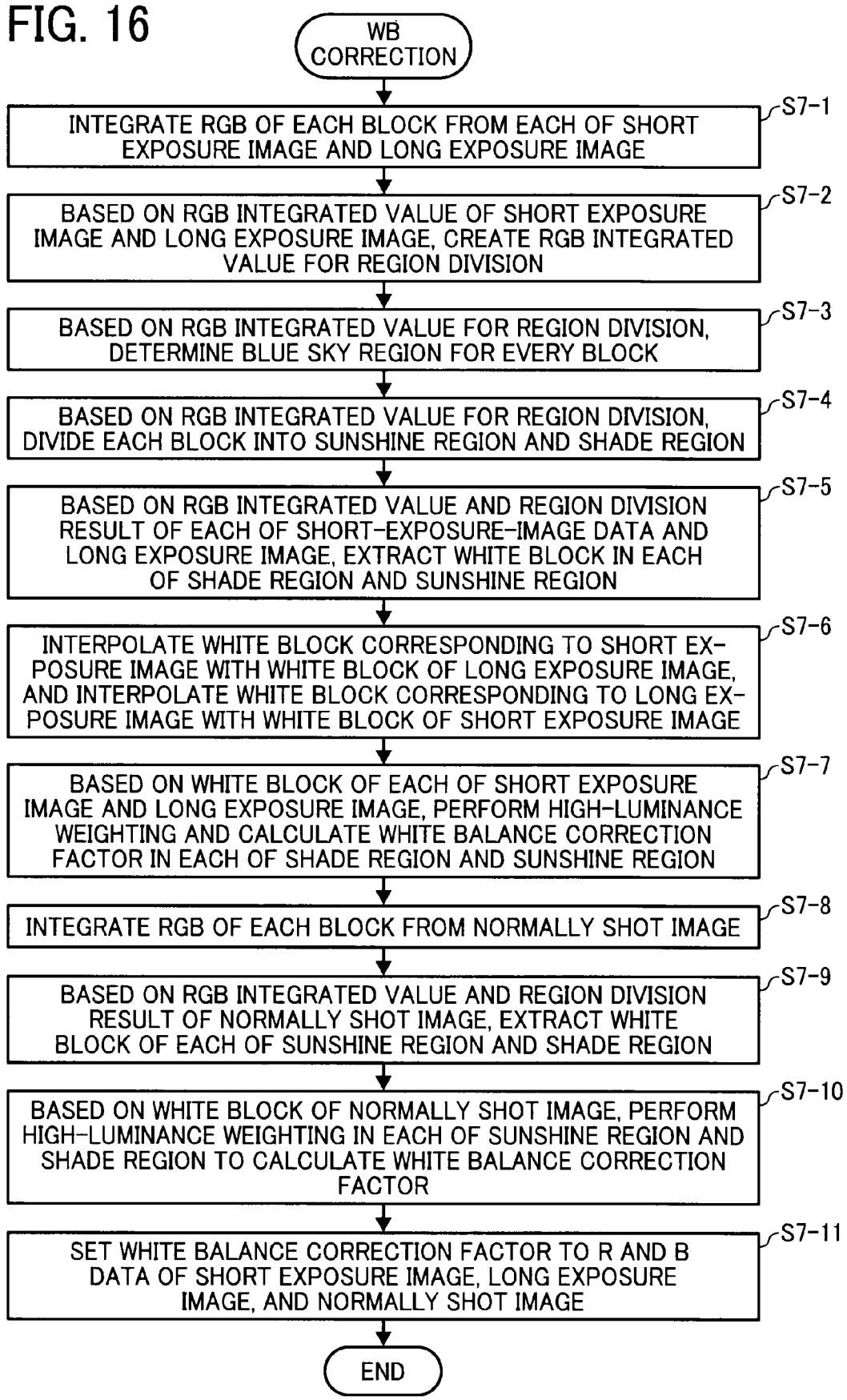
FIG. 16 is a flow diagram showing a flow of a series of WB correction processing in a seventh embodiment of the imaging apparatus according to the present invention.

FIG. 16 is a flow chart showing, as a flow, a series of WB correction processing in a seventh embodiment of the imaging apparatus according to the present invention.

Note that the embodiment is the same as the fourth embodiment except that the embodiment is different in that the embodiment is provided with S7-8 to S7-10 in addition to the fourth embodiment and S7-11 differs from S4-8. That is to say, since steps S4-1 to S4-7 are the same as S7-1 to S7-7, description thereof will be omitted.

S7-8

In the embodiment, usually, shot image data is read from the SDRAM and inputted into the CCD-I/F. Then, each of R, G, B is integrated by the block formed in a grid pattern across the picture plane on the basis of the number of divisions and the size of a detection frame preset by a detection circuit in the CCD-I/F for every image, and is outputted to a register that can be read by the SDRAM or the CPU.

Note that, typically, shot image data has a longer exposure time than the short-exposure-image data described earlier and a shorter exposure time than the long-exposure-image data described earlier.

S7-9 to 7-10

Next, typically, for RGB integrated values acquired in terms of a block in the shot image data, white block extraction and calculation of a white balance correction factor are performed as in S7-5 and S7-7 (or S4-5 and S4-7).

Then, a sunshine region and a shade region in typical shot image data are based on the result of the region division performed in S7-4 above, and in general, it is not necessary to use the shot image data and newly divide regions. This enables division of sunshine/shade regions for data of multiple images which are simultaneously shot by single region division, thereby making high-speed processing possible.

Note that, typically, a white extraction range in the shot image data is preset by the white extraction range setting device. Additionally, it is preferably different from the white extraction range for short-exposure-image data and the white extraction range for long-exposure-image data, which are described above. It is further preferable that, similar to the white extraction range for short-exposure-image data and the white extraction range for the long-exposure-image data, different ranges are set for a sunshine region and a shade region.

S7-11

Based on the WB correction factors Rgain, Bgain which have been acquired till S7-10 as described above, WB correction factors Rgain, Bgain are set for each of R, B data of the short-exposure-image data and the long-exposure-image data, and R, B data of normally shot images.

(Eighth Embodiment of White Balance Correction)

Figure 17:
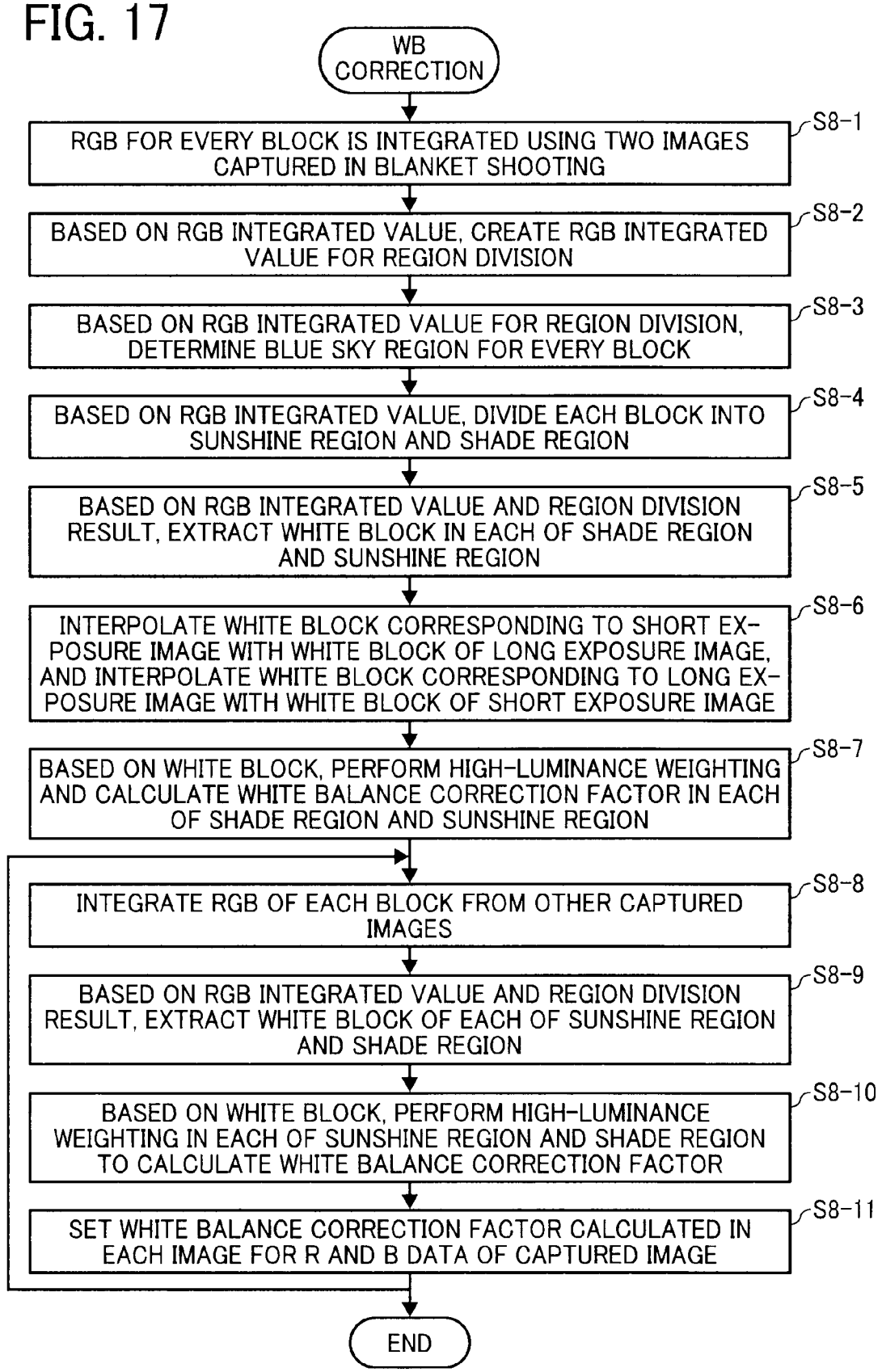
FIG. 17 is a flow diagram showing a flow of a series of WB correction processing in an eighth embodiment of the imaging apparatus according to the present invention.

FIG. 17 is a flow chart showing, as a flow, a series of WB correction processing in an eighth embodiment of the imaging apparatus according to the present invention.

Note that the embodiment is the same as the fourth embodiment except that the embodiment is different in that: S8-1 differs from S4-1, the embodiment is provided with S8-8 to S8-10 in addition to the fourth embodiment, and S8-11 differs from S4-8. That is to say, since steps S4-2 to S4-7 are the same as S8-2 to S8-7, description thereof will be omitted.

S8-1

First, in blanket shooting, data before signal processing is stored in the SDRAM as Raw-RGB of multiple images for which exposure conditions are changed.

Then, in the embodiment, after data for any two images of multiple images stored in the SDRAM is read from the SDRAM and inputted into the CCD-I/F, each of R, G, B is integrated by the blocks formed in a grid pattern across the picture plane on the basis of the number of divisions and the size of a detection frame preset by a detection circuit in the CCD-I/F for every image data, and RGB integrated values are outputted to a register that can be read by the SDRAM or CPU.

Note that, in the embodiment, out of the any 2 images, the image shot with the exposure condition which is low exposure is considered as short-exposure-image data, and the image shot with the exposure condition which is high exposure is considered as long-exposure-image data. Then, step S8-1 can be considered as the same step as S4-1 in the first embodiment described above.

S8-8

Next, in multiple images stored in the SDRAM, after data of any one image other than the given 2 images selected in S8-1 is read from the SDRAM and inputted into the CCD-I/F, each of R, G, B is integrated by the blocks formed in a grid pattern across the picture plane on the basis of the number of divisions and the size of a detection frame preset by a detection circuit in the CCD-I/F for every image data, and RGB integrated values are outputted to a register that can be read by the SDRAM or CPU.

S8-9 to S8-10

Next, for the RGB integrated values acquired by the block in S8-8, white block extraction and calculation of a white balance correction factor are performed as in S8-5 and S8-7 (or S4-5 and S4-7).

Then, a sunshine region and a shade region at this time are based on the result of the region division performed in S8-4 above, and do not require any region to be newly divided. This enables division of sunshine/shade regions for data of multiple images which are simultaneously shot by single region division, thereby making high-speed processing possible.

Note that, the white extraction range in S8-9 is preset by the white extraction range setting device. Additionally, it is preferably different from the white extraction range for short-exposure-image data and the white extraction range for long-exposure-image data (white extraction data used in data of the any 2 images). Furthermore, it is more preferable that, similar to the white extraction range for the white extraction range for the short-exposure-image data and the white extraction range for the long-exposure-image data, different ranges are set in the sunshine region and the shade region.

S8-11

Based on the WB correction factors Rgain, Bgain which have been acquired till S8-11 as described above, the WB correction factors Rgain, Bgain are set for each of R, B data of data for multiple images for which the exposure condition has been changed in blanket shooting.

However, if the WB correction factors Rgain, Btain are not calculated for all of data for the multiple images for which the exposure condition has been changed in blanket shooting, steps S8-8 to S8-10 above are repeated.

(Ninth Embodiment of White Balance Correction)

Figure 18:
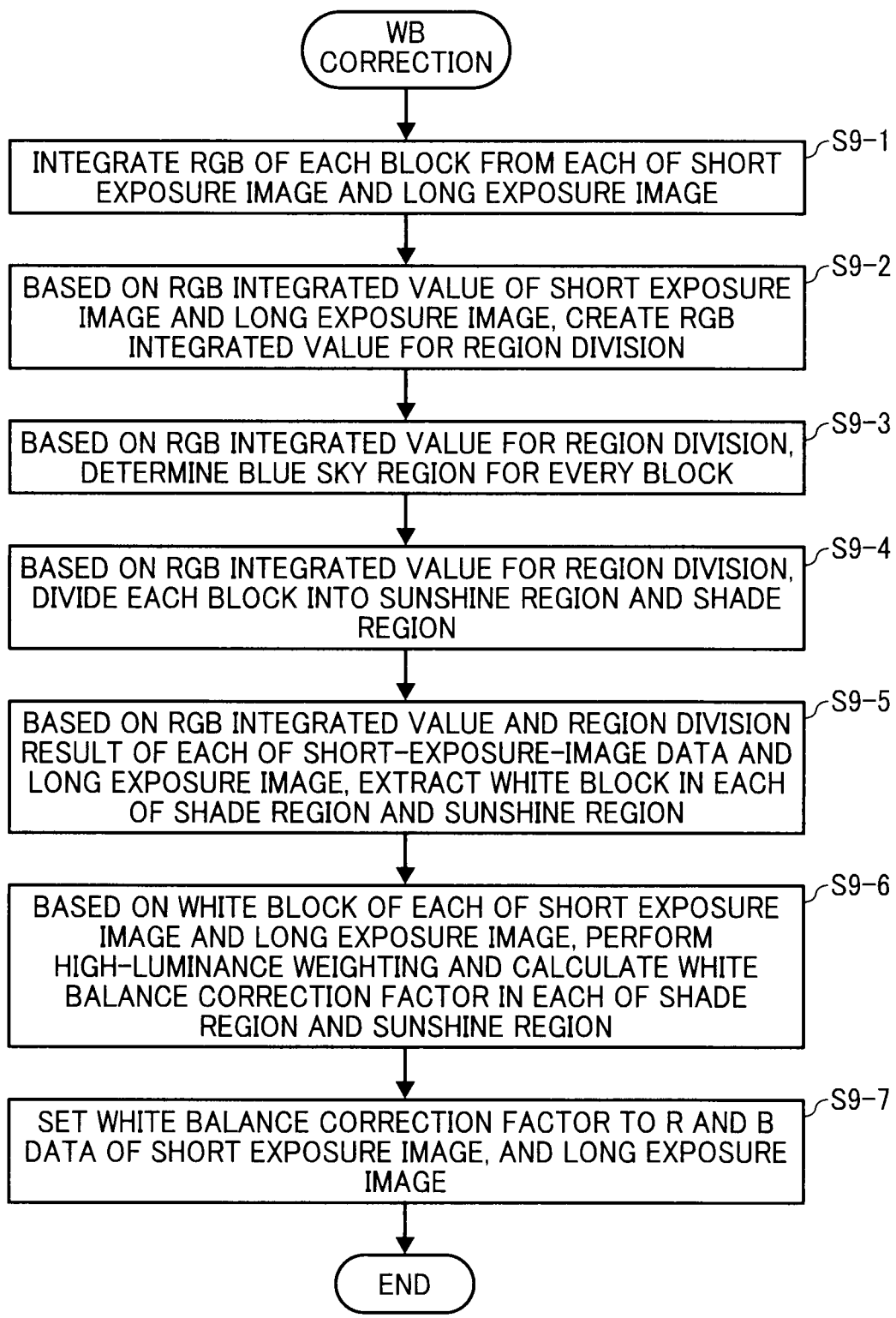
FIG. 18 is a flow diagram showing a flow of a series of WB correction processing in a ninth embodiment of the imaging apparatus according to the present invention.

FIG. 18 is a flow chart showing, as a flow, a series of WB correction processing in a ninth embodiment of the imaging apparatus according to the present invention.

Note that, the embodiment is identical to the fourth embodiment, except that correction of the white extraction result in S4-6 is not performed. That is to say, steps S9-1 to S9-5 are the same as S4-1 to S4-5, a description of which is omitted.

(S9-6 to S9-7: Calculation/Setting of White Balance Correction Factor)

Next, a short exposure image white balance correction factor and a long exposure image white balance correction factor are calculated.

To calculate the short exposure image white balance correction factor, the short-exposure-image data white extraction result is used. To calculate the long-exposure-image data white balance correction factor, the long-exposure-image data white extraction result is used.

However, then, the short exposure image white balance correction factor is separately calculated in each of a sunshine region and in a shade region, and the long exposure image white balance correction factor is separately calculated in each of the sunshine region and the shade region.

Steps S9-6 to S9-7 will be described hereinafter in detail.

S9-6

Each of the short-exposure-image data white extraction result and the long-exposure-image data white extraction result is subjected to high-luminance weighting processing, and then they are integrated. The integration is performed by using the expression (2) as in S4-7. Following this, after S9-7 to be described later, a short exposure image white balance correction factor per pixel and a long exposure image white balance correction are calculated. They shall be WB correction factors, which are Rgain and Bgain.

However, in the embodiment, when G/R, and G/B of each white extraction block of the short-exposure-image data white extraction result is weighted by average luminance of the white extraction block, calculation is independently performed in each of separated sunshine region and shade region. Accordingly, for weighting by average luminance, weighting is performed in a sunshine region or a shade region to which the white extraction block belongs to, and not performed in any region to which the white extraction block does not belong to (this is the same as in S4-7 above).

Then, as in the first embodiment described above, it is preferable that a luminance value is then adjusted by using the expression (3).

S9-7

After the high-luminance weighting processing and the integration were performed in S9-6 above, by independently making an area-to-area correction to G/R, and G/B for every pixel on the color coordinate, a short exposure image white balance correction factor and a long exposure image white balance correction factor are determined. The specific calculation of the short exposure image white balance correction factor and the long exposure image white balance correction factor is the same as in S4-8 above.

Note that, it is preferable to calculate them independently on separated sunshine region and shade region, and the embodiment is the same as in S4-8 above in this regard.

(Tenth Embodiment of White Balance Correction)

Figure 19:
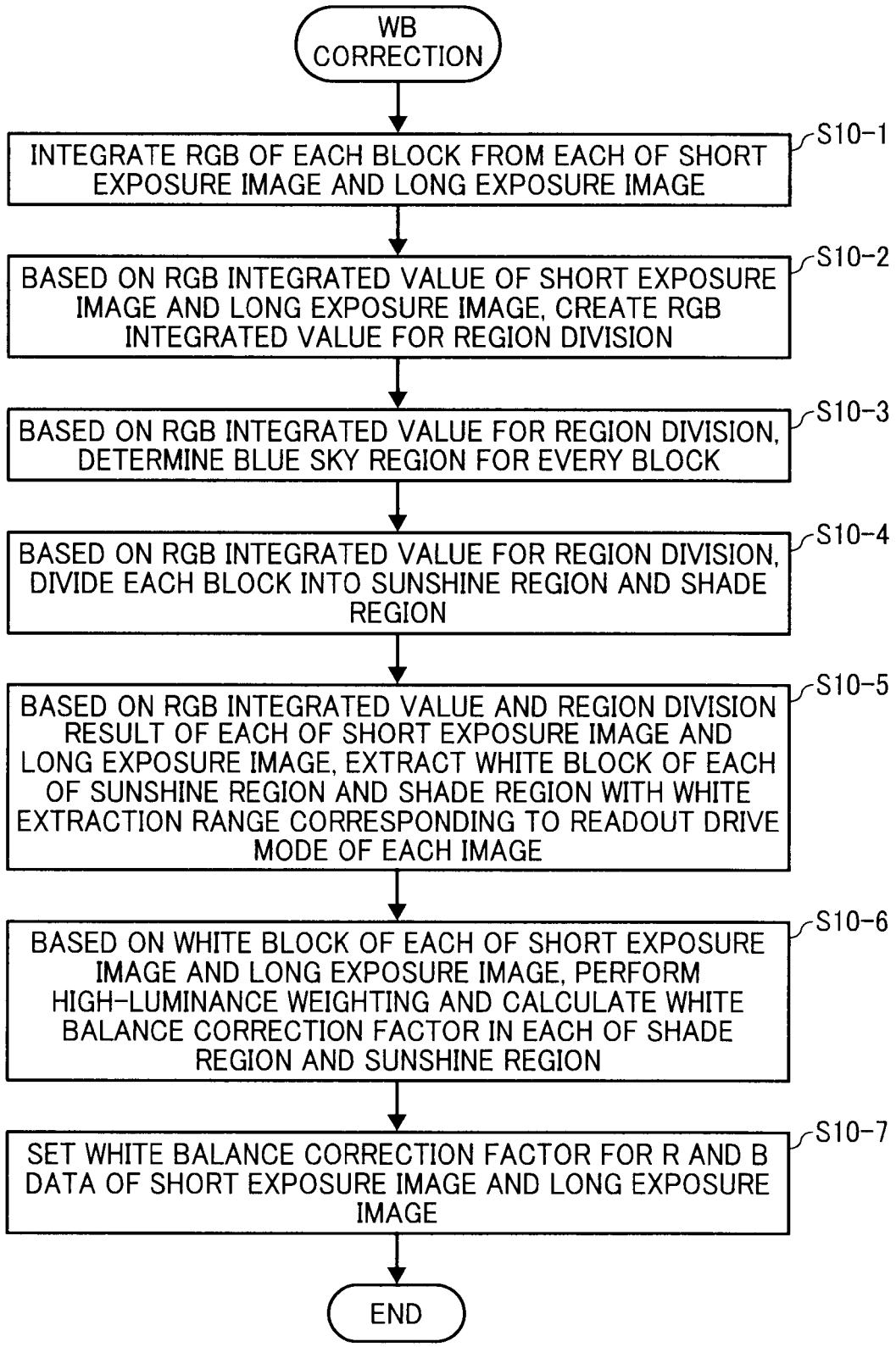
FIG. 19 is a flow diagram showing a flow of a series of WB correction processing in a tenth embodiment of the imaging apparatus according to the present invention.

FIG. 19 is a flow chart showing, as a flow, a series of WB correction processing in a tenth embodiment of the imaging apparatus according to the present invention.

Note that, the processing in the embodiment is identical to a series of WB correction processing, excluding step S5-6, in the fifth embodiment described above, and a description of overlapping content will be omitted.

Steps S10-6 to S10-7 in the embodiment are the same as S9-6 to S9-7 in the ninth embodiment.

(Eleventh Embodiment of White Balance Correction)

Figure 20:
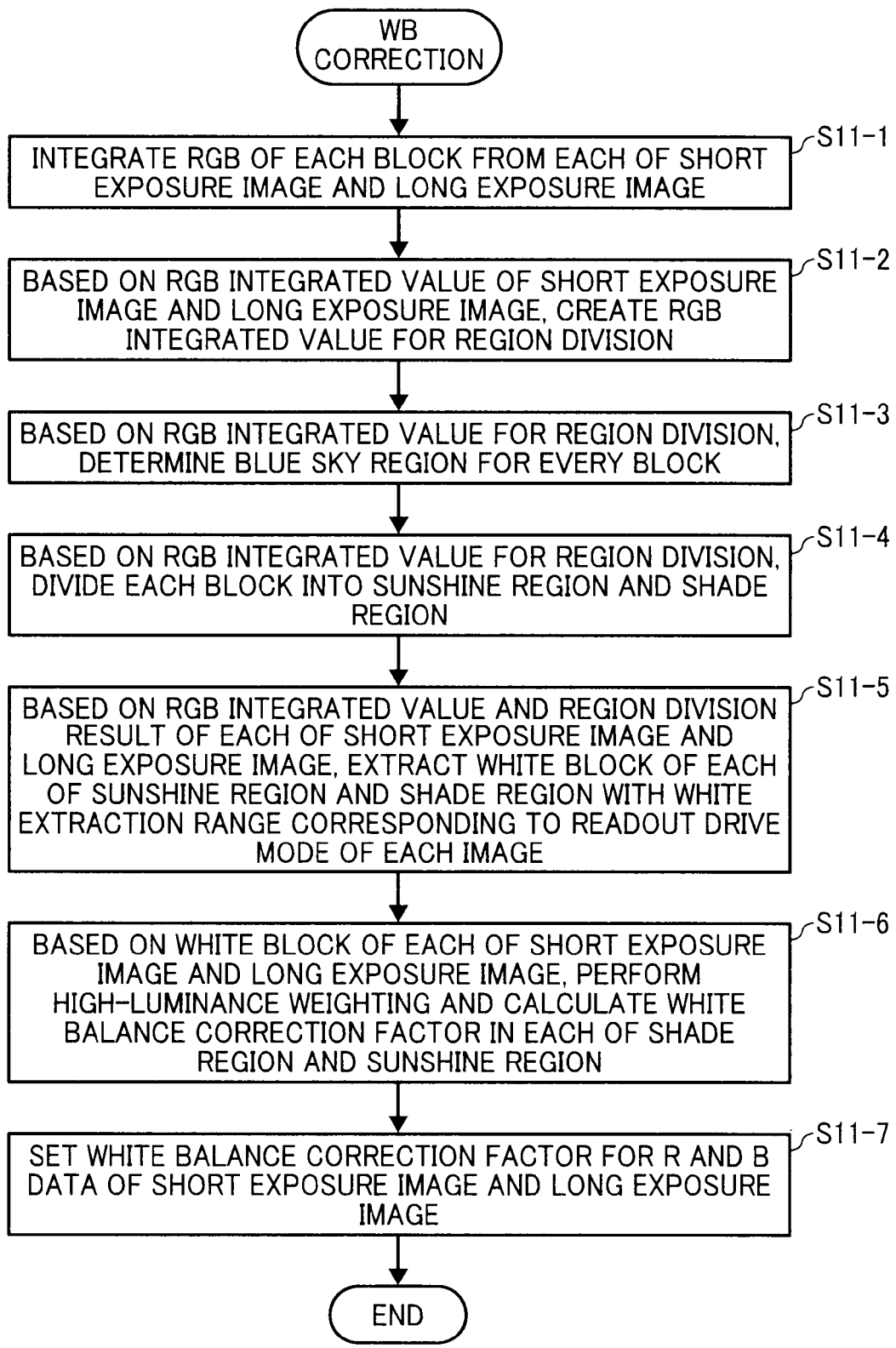
FIG. 20 is a flow diagram showing a flow of a series of WB correction processing in an eleventh embodiment of the imaging apparatus according to the present invention.

FIG. 20 is a flow chart showing, as a flow, a series of WB correction processing in an eleventh embodiment of the imaging apparatus according to the present invention.

Note that, the processing in the embodiment is identical to a series of WB correction processing, excluding step S6-6, in the sixth embodiment described above, and a description of overlapping content will be omitted.

Steps S11-6 to S11-7 in the embodiment are the same as S9-6 to S9-7 in the ninth embodiment.

(Twelfth Embodiment of White Balance Correction)

Figure 21:
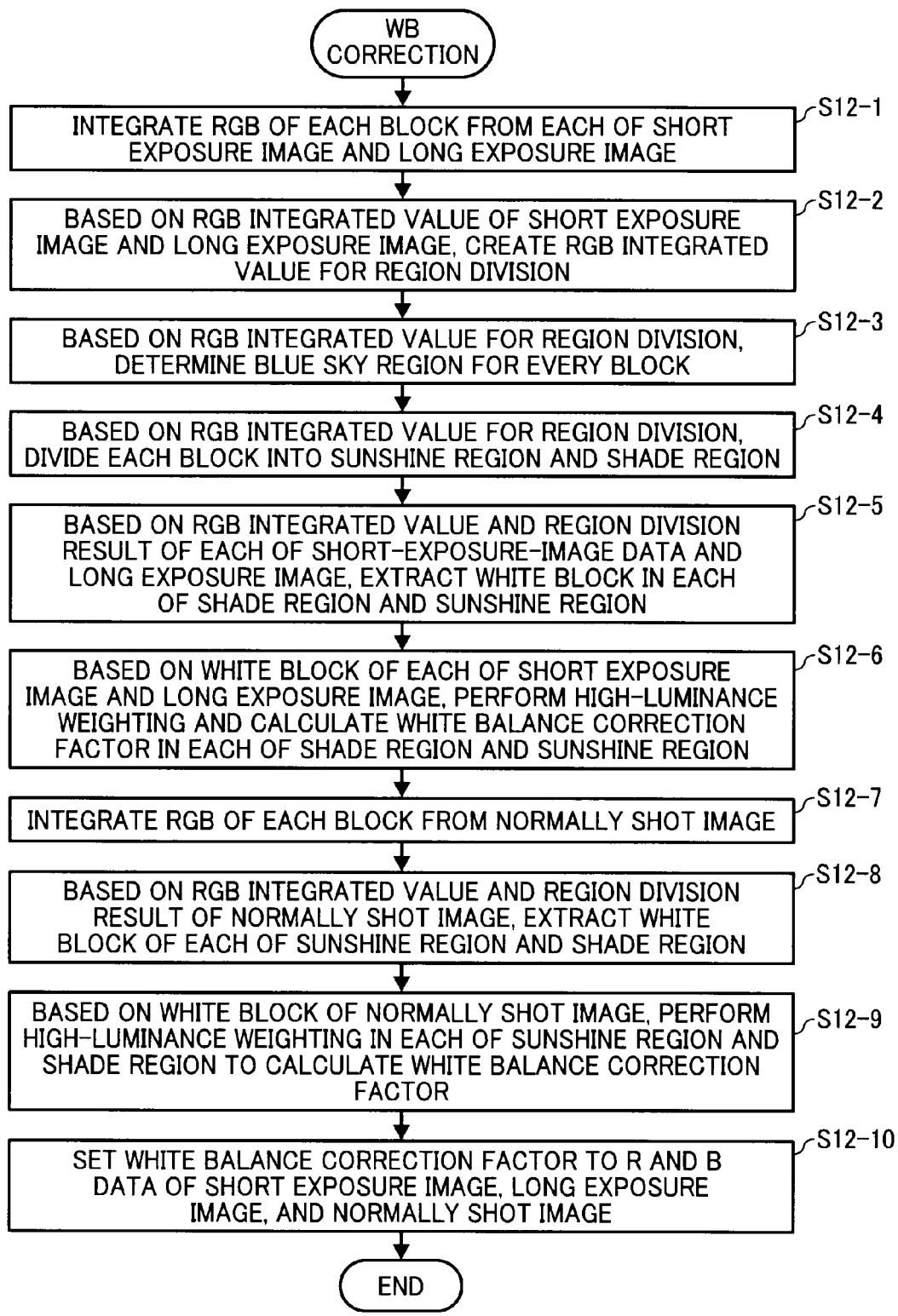
FIG. 21 is a flow diagram showing a flow of a series of WB correction processing in a twelfth embodiment of the imaging apparatus according to the present invention.

FIG. 21 is a flow chart showing, as a flow, a series of WB correction processing in a twelfth embodiment of the imaging apparatus according to the present invention.

Note that, the processing in the embodiment is identical to a series of WB correction processing, excluding step S7-6, in the seventh embodiment described above, and a description of overlapping content will be omitted.

Steps S12-6 in the embodiment is the same as S9-6 in the ninth embodiment. Steps S12-7 to S12-10 in the embodiment are the same as S7-8 to S7-11 in the seventh embodiment.

FIG. 22 is a flow chart showing, as a flow, a series of WB correction processing in a thirteenth embodiment of the imaging apparatus according to the present invention.

Note that, the processing in the embodiment is identical to a series of WB correction processing, excluding step S8-6, in the eighth embodiment described above, and a description of overlapping content will be omitted.

Steps S13-6 in the embodiment is the same as S9-6 in the ninth embodiment. Steps S13-7 to S13-10 in the embodiment are the same as S8-8 to S8-11 in the eighth embodiment.

Conventionally, region division is performed on one image in some cases; however, the region division cannot be performed accurately because width or volume of data in one image is small.

In contrast, in the ninth to thirteenth embodiments described above, since the region division is performed by using both long-exposure-image data and short-exposure image data, in sunshine/shade region division, the sunshine/shade region division can be performed with higher accuracy than in the case in which the division is performed with either the long-exposure-image data or the short-exposure-image data.

Hence, a white balance correction factor can be calculated in each of sunshine/shade regions which is divided accurately in long exposure image and short exposure image, and accurate white balance correction can be performed on each of the sunshine/shade regions. As a result, even in a synthesized image, favorable white balance correction which does not cause a color shift across a picture plane can be performed.

REFERENCE EXAMPLE 1

Additionally, in the eighth embodiment, for example, when data for k images with the exposure condition changed in blanket shooting are stored, data for k images are organized into k/2 sets, each set consisting of 2 images, and steps S8-1 to S8-7 are performed on each set. That is to say, steps S8-1 to S8-7 are repeated k/2 times, and data of k/2 images may be obtained (then, steps S8-8 to S8-10 are omitted).

REFERENCE EXAMPLE 2

Further, in the eighth embodiment, for example, any 1 image may be used instead of any 2 images selected in S8-1, and steps S8-2 to S8-5 and S8-7 may be performed on the given 1 image. Needless to say, since any 1 image is used, S8-6 is omitted.

Following S8-7, steps S8-8 and S8-10 are repeated, and WB correction factors Rgain, Bgain are calculated for all data of multiple images for which the exposure condition was changed in blanket shooting, and the WB correction factors Rgain, Bgain are set by using the acquired WB correction factors Rgain, Bgain in S8-11.

Then, the region division result obtained in S8-4 is used in any of a repetition a of the steps S8-8 to S8-10. This enables division of sunshine/shade regions of data for multiple images shot simultaneously, in single region division, thereby making high-speed processing possible.

[Recording Medium]

IN recording medium according to the present invention is a recording medium which records a program for enabling shooting operation of the embodiments described above to be performed in a computer provided in a device having the capability of image processing. In addition, any form of a recording medium (computer language) or any method for recording the program can be used as long as it is conventionally known.

EFFECT OF THE INVENTION

The present invention provides an imaging apparatus and an imaging method which can perform good white balance correction which does not cause a color shift across the picture plane even in an image obtained by synthesizing long exposure image and short exposure image, and a computer-readable recording medium in which a program for causing a computer to perform the imaging method is recorded.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
an image pickup element configured to convert light from an optical system for a short time into an electric signal to output a short-exposure-image data, and convert light from the optical system for a long time into an electric signal to output a long-exposure-image data;
a white balance evaluation value acquiring device configured to acquire a white balance evaluation value for short-exposure-image data from the short-exposure-image data, and acquire a white balance evaluation value for long-exposure-image data from the long-exposure-image data;
a white extraction range setting device configured to set a white extraction range for short-exposure-image data and a white extraction range for long-exposure-image data;
a white extraction device configured to extract a short-exposure-image data white extraction result on the basis of the white balance evaluation value for short-exposure-image data and the white extraction range for short-exposure-image data, and extract a long-exposure-image data white extraction result on the basis of the white balance evaluation value for long-exposure-image data and the white extraction range for long-exposure-image data;
a correction factor calculating device configured to calculate a short exposure image white balance correction factor by using the short-exposure-image data white extraction result, and calculate a long exposure image white balance correction factor by using the long-exposure-image data white extraction result;
a white balance correcting device configured to correct the short-exposure-image data to form white balance corrected short-exposure-image data by using the short exposure image white balance correction factor, and correct the long-exposure-image data to form white balance corrected long-exposure-image data by using the long exposure image white balance correction factor; and
a synthesizing device configured to synthesize the white balance corrected short-exposure-image data and the white balance corrected long-exposure-image data,
wherein the correction factor calculating device is configured to calculate a corrected long-exposure-image data white extraction result from the long-exposure-image data white extraction result on the basis of the white extraction range for short-exposure-image data and calculate the short exposure image white balance correction factor by using the corrected long-exposure-image data white extraction result and the short-exposure-image data white extraction result, and calculate a corrected short-exposure-image data white extraction result from the short-exposure-image data white extraction result on the basis of the white extraction range for long-exposure-image data and calculate the long exposure image white balance correction factor by using the corrected short-exposure-image data white extraction result and the long-exposure-image data white extraction result.

2. The imaging apparatus according to claim 1, wherein the white extraction range setting device sets the white extraction range for short-exposure-image data and the white extraction range for long-exposure-image data, in accordance with a voltage to be applied to the image pickup element.

3. The imaging apparatus according to claim 1, wherein the white extraction range setting device sets the white extraction range for short-exposure-image data and the white extraction range for long-exposure-image data, in accordance with a drive frequency of the image pickup element.

4. The imaging apparatus according to claim 1, further comprising a sunshine/shade region division device configured to perform division of the short-exposure-image data and the long-exposure-image data into a sunshine region and a shade region,
wherein the white extraction range for short-exposure-image data includes a sunshine region white extraction range for short-exposure-image data corresponding to the sunshine region and a shade region white extraction range for short-exposure-image data corresponding to the shade region,
the white extraction range for long-exposure-image data includes a sunshine region white extraction range for long-exposure-image data corresponding to the sunshine region and a shade region white extraction range for long-exposure-image data corresponding to the shade region, and
the correction factor calculating device is configured to calculate the short exposure image white balance correction factor for each of the sunshine region and the shade region, and calculate the long exposure image white balance correction factor for each of the sunshine region and the shade region.

5. An imaging method, comprising:
a photoelectric conversion step of converting light from an optical system for a short time into an electric signal to output short-exposure-image data by an image pickup element, and of converting light from the optical system for a long time into an electric signal to output long-exposure-image data by the image pickup element;
a white balance evaluation value acquiring step of acquiring a white balance evaluation value for short-exposure-image data from the short-exposure-image data, and acquiring a white balance evaluation value for long-exposure-image data from the long-exposure-image data;
a white extraction range setting step of setting a white extraction range for short-exposure-image data and a white extraction range for long-exposure-image data;
a white extraction step of extracting a short-exposure-image data white extraction result on the basis of the white balance evaluation value for short-exposure-image data and the white extraction range for short-exposure-image data, and extracting a long-exposure-image data white extraction result on the basis of the white balance evaluation value for long-exposure-image data and the white extraction range for long-exposure-image data;
a correction factor calculating step of calculating a corrected long-exposure-image data white extraction result from the long-exposure-image data white extraction result on the basis of the white extraction range for short-exposure-image data and calculating a short exposure image white balance correction factor by using the corrected long-exposure-image data white extraction result and the short-exposure-image data white extraction result, and of calculating a corrected short-exposure-image data white extraction result from the short-exposure-image data white extraction result on the basis of the white extraction range for long-exposure-image data and calculating a long exposure image white balance correction factor by using the corrected short-exposure-image data white extraction result and the long-exposure-image data white extraction result;
a white balance correcting step of correcting the short-exposure-image data to form white balance corrected short-exposure-image data by using the short exposure image white balance correction factor, and correcting the long-exposure-image data to form white balance corrected long-exposure-image data by using the long exposure image white balance correction factor; and
a synthesizing step of synthesizing the white balance corrected short-exposure-image data and the white balance corrected long-exposure-image data.

6. The imaging method according to claim 5, wherein the white extraction range setting step includes a step of setting a white extraction range for short-exposure-image data and a white extraction range for long-exposure-image data, in accordance with a voltage to be applied to the image pickup element.

7. The imaging method according to claim 5, wherein the white extraction range setting step includes a step of setting the white extraction range for short-exposure-image data and the white extraction range for long-exposure-image data, in accordance with a drive frequency of the image pickup element.

8. The imaging method according to claim 5, further comprising a sunshine/shade region division step of performing division of the short-exposure-image data and the long-exposure-image data into a sunshine region and a shade region,
wherein the white extraction range for short-exposure-image data includes a sunshine region white extraction range for short-exposure-image data corresponding to the sunshine region and a sunshade region white extraction range for short-exposure-image data corresponding to the shade region,
the white extraction range for long-exposure-image data includes a sunshine region white extraction range for long-exposure-image data corresponding to the sunshine region and a shade region white extraction range for long-exposure-image data corresponding to the shade region, and
the correction factor calculating step includes a step of calculating the short exposure image white balance correction factor for each of the sunshine region and the shade region, and calculating the long exposure image white balance correction factor for each of the sunshine region and the shade region.

9. An imaging apparatus comprising:
an image pickup element configured to convert light from an optical system for a short time into an electric signal to output a short-exposure-image data, and convert light from the optical system for a long time into an electric signal to output a long-exposure-image data;
a white balance evaluation value acquiring device configured to acquire a white balance evaluation value for short-exposure-image data from the short-exposure-image data, and acquire a white balance evaluation value for long-exposure-image data from the long-exposure-image data;
a white extraction range setting device configured to set a white extraction range for short-exposure-image data and a white extraction range for long-exposure-image data;

a white extraction device configured to extract a short-exposure-image data white extraction result on the basis of the white balance evaluation value for short-exposure-image data and the white extraction range for short-exposure-image data, and extract a long-exposure-image data white extraction result on the basis of the white balance evaluation value for long-exposure-image data and the white extraction range for long-exposure-image data;

a correction factor calculating device configured to calculate a short exposure image white balance correction factor by using the short-exposure-image data white extraction result, and calculate a long exposure image white balance correction factor by using the long-exposure-image data white extraction result;

a white balance correcting device configured to correct the short-exposure-image data to form white balance corrected short-exposure-image data by using the short exposure image white balance correction factor, and correct the long-exposure-image data to form white balance corrected long-exposure-image data by using the long exposure image white balance correction factor;

a synthesizing device configured to synthesize the white balance corrected short-exposure-image data and the white balance corrected long-exposure-image data; and a sunshine/shade region division device configured to use the short-exposure-image data for a high-luminance part and the long-exposure-image data for a low-luminance part to divide the short-exposure-image data and the long-exposure-image data into a sunshine region and a shade region, wherein:

the white extraction range for short-exposure-image data includes a sunshine region white extraction range for short-exposure-image data corresponding to the sunshine region and a shade region white extraction range for short-exposure-image data corresponding to the shade region, the white extraction range for long-exposure-image data includes a sunshine region white extraction range for long-exposure-image data corresponding to the sunshine region and a shade region white extraction range for long-exposure-image data corresponding to the shade region, and the correction factor calculating device is configured to calculate the short exposure image white balance correction factor for each of the sunshine region and the shade region, and calculate the long exposure image white balance correction factor for each of the sunshine region and the shade region.

* * * * *